(12) United States Patent
Obeyesekere et al.

(10) Patent No.: US 11,194,983 B1
(45) Date of Patent: Dec. 7, 2021

(54) PROFILE BASED AUGMENTED REALITY APPLICATIONS BASED ON INFORMATION TAGS

(71) Applicant: Amazon Technologies, Inc., Reno, NV (US)

(72) Inventors: Vasitha Nihal Obeyesekere, Seattle, WA (US); Kim S. Houchens, Seattle, WA (US); Kitt Karhohs, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/561,789

(22) Filed: Sep. 5, 2019

(51) Int. Cl.
*G06T 19/00* (2011.01)
*G06K 7/14* (2006.01)

(52) U.S. Cl.
CPC ......... *G06K 7/1447* (2013.01); *G06K 7/1417* (2013.01); *G06K 7/1443* (2013.01); *G06K 7/1452* (2013.01); *G06T 19/006* (2013.01)

(58) Field of Classification Search
CPC .. G06T 19/006; G06K 7/1417; G06K 7/1443; G06K 7/1447; G06K 7/1452
USPC .................................................. 345/619, 633
See application file for complete search history.

(56) References Cited

U.S. PATENT DOCUMENTS

| | | |
|---|---|---|
| 2013/0282715 A1 | 10/2013 | Xu |
| 2014/0180136 A1 | 4/2014 | Zhao |
| 2015/0091780 A1 | 4/2015 | Lyren |
| 2015/0213238 A1* | 7/2015 | Farha ................ H04L 63/101 726/30 |
| 2015/0294433 A1 | 10/2015 | Ye |
| 2016/0125765 A1 | 5/2016 | Meretei |
| 2016/0189288 A1 | 6/2016 | Todeschini |
| 2017/0200193 A1* | 7/2017 | Bigley .............. G06Q 30/0621 |
| 2017/0270324 A1* | 9/2017 | Younger ........... G06K 19/0723 |
| 2018/0197336 A1 | 7/2018 | Rochford |
| 2019/0012756 A1* | 1/2019 | Han ..................... G06T 19/006 |
| 2019/0019335 A1 | 1/2019 | Elangovan |
| 2019/0303634 A1* | 10/2019 | Broselow ............ G06K 7/1417 |
| 2019/0362554 A1 | 11/2019 | Chen |

OTHER PUBLICATIONS

U.S. Non-Final Office Action issued in U.S. Appl. No. 16/549,654 dated Sep. 10, 2020.
Kan, Tai-Wei, Chin-Hung Teng and Wen-Shou Chou "Applying QR code in augmented reality applications"? *Proceedings of the 8th International Conference on Virtual Reality Continuum and its Applications in Industry*. (2009).
U.S. Final Office Action issued in U.S. Appl. No. 16/549,654 dated Feb. 4, 2021.

* cited by examiner

*Primary Examiner* — Jacinta M Crawford
(74) *Attorney, Agent, or Firm* — Hogan Lovells US LLP

(57) ABSTRACT

A tag positioned on an object provides information for selecting augmented reality (AR) content that is based, at least in part, on a user profile or other user information. The tag may be utilized to transmit messages between users where AR content can be integrated into the message and presented upon scanning and processing of the tag. The AR content may also be related to user interests or real time user information, such as user location. The user may interact with the AR content to retrieve additional information, which provides an improved customer experience and improved integration into a provider ecosystem.

20 Claims, 18 Drawing Sheets

US 11,194,983 B1

PROFILE BASED AUGMENTED REALITY APPLICATIONS BASED ON INFORMATION TAGS

BACKGROUND

The widespread adoption of portable computing devices, such as smartphones and tablet computers, has resulted in a corresponding increase in the amount and types of electronic content available to users. This includes the providing of augmented reality (AR) content, where a device can capture video content of a location and a computing device can render content such that it appears, at least as displayed on a screen of the device, that the content exists in that location. As the computing device moves, the view of the content can change accordingly, being rendered as if the content corresponds to an actual three-dimensional object being captured by the camera of the device at the appropriate location and angle. Often, the AR content is generically applied or procedurally generated, which may limit applications for specific users.

BRIEF DESCRIPTION OF THE DRAWINGS

Various embodiments in accordance with the present disclosure will be described with reference to the drawings, in which.

DETAILED DESCRIPTION

Figure 1:
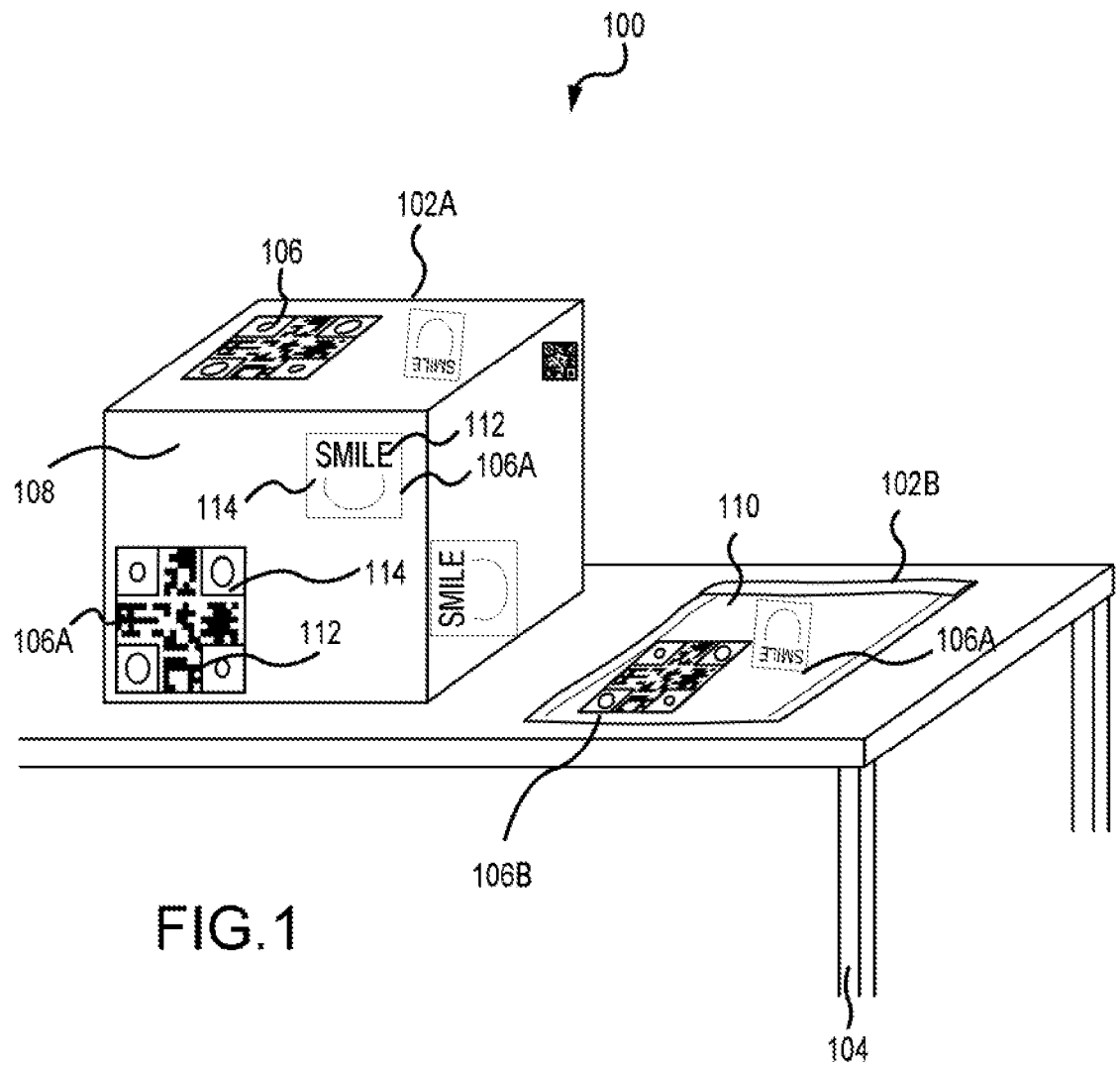
FIG. 1 illustrates an example approach to using physical objects in an augmented reality (AR) environment that can be analyzed in accordance with various embodiments.

Systems and methods in accordance with various embodiments of the present disclosure overcome one or more of the above-referenced and other deficiencies in conventional approaches to implementing augmented reality (AR) content. For example, it may be desirable for a user to receive or send AR content that is customized based on one or more factors of the user, such as geographical location, a special occasion, or the like. However, traditional AR content is a "one size fits all" approach where AR content is presented without accounting for specific users that may be interacting with the content. As a result, the experience may feel less authentic, which may dissuade the user from utilizing the content at all.

In various embodiments, AR content may be customized for a user and provide information that enhances a user's experience with one or more products. For example, a user may order an item, such as from an online marketplace, and may want to obtain more information about the item. In various embodiments, the user's purchase may be tied to a user account, which is associated with an AR application executing on a client device, to provide information to the user. For example, the user may receive the item within a package and want to recycle the package, but may be unsure whether the package is recyclable. The user may scan the packaging with the client device and the AR application may provide accessible content to the user regarding the packaging, such as the material of composition, local recycle centers, and the like. The user, as a result, may receive the data in a way that makes it easy to process and is thus more likely to act on the information. Furthermore, additional information may be presented that may be tied to the user via the account. For example, an environmentally conscious consumer may receive additional information about recycling or waste reduction programs.

In certain embodiments, different accounts may be tied to one another to send and receive personalized messages or the like. For example, in various embodiments, users may use an online marketplace to send gifts to other users. The gifts may be selected by a second user, such as being part of a registry or list. The first user may select a gift from the registry for receipt by the second user. Often, with gifts, it may be desirable to add wrapping or other special touches such as personalized messaging. However, this additional material may be limited based on available combinations of material, or other factors. Additionally, special packaging may be damaged or otherwise change in appearance as it is transported from a fulfillment center to the user. In various embodiments, the first user may send an AR message to the second user, which the second user may retrieve by interacting with the received item via their device. The message may be personalized, such that it includes images, sounds, and the like. Providing the first user the option to provide the AR messages may increase the variety of information that can be sent, as opposed to combinations of gift wrap or the like. Furthermore, the first user may control who may send the messages and how the messages are received, thereby increasing the privacy for the first user and granting control over access to information, such as the first user's address.

In certain embodiments, AR content may be personalized for a user based on a user selection, such as a tactile interaction with a component, such as the packaging. For example, the user may answer a list of questions (e.g., physically by marking an answer, digitally by selecting a choice, etc.) and the answers to those questions may be used to generate the AR content. As a result, the user may be more engaged with the AR content or with the provider of the AR content. In various embodiments, a theme of the questions may be based on information from the user's account. For example, the content may be related to a quiz to determine a favorite television character based on the user account indicating that the user has watched multiple episodes of a particular television program.

Embodiments of the present disclosure are directed toward associating user information to provide customizable or particularized AR content to the user in a variety of different circumstances. In embodiments, the AR content may be educational in order to guide the user toward making a selection or achieving a task. In other embodiments, the AR content may be celebratory or selected by a second user for a first user's enjoyment. Additionally, in embodiments, AR content may be varied based on information about the user. In various embodiments, information from a user account may be utilized to select potential AR content. Moreover, in various embodiments, one or more sensors of a user device may be used, such as using a GPS device within a user device in order to locate nearby recycling facilities, or the like. Additionally, AR content may be associated with various programs or promotions from a provider of the AR content.

As mentioned, an increasing number of applications are being developed that provide an AR experience, if not a full virtual reality (VR) experience. In a conventional augmented reality experience, a user is able to utilize a computing device (or computer-connected device) with a camera to capture and display a live view of an area around the user. An augmented reality application executing on the computing device can analyze at least a portion of the captured image data, as well as sensor data and the like, to determine information about the region around the user, such as the locations of various physical objects or surfaces. This information makes up the background of the "scene" in which augmented reality content is to be displayed. The AR application can utilize the scene information to locate surfaces and/or locations at which it is appropriate to place virtual objects of the AR application or to identify specific physical objects for interaction with the virtual objects. For example, the application might decide to place virtual animals or the like at various nearby locations, such that when the user views the live camera feed through a display of the AR device, the view will display a rendering of the animals over the live camera feed such that it appears as if the virtual animals are located in that scene. Additionally, in embodiments of the present disclosure, the physical objects or services may be isolated for direct incorporation into the AR experience, as described below. As the user moves the AR device, the rendering of the animals or other content will adjust as well, such that it appears as if the animal or other content is actually physically located at a particular location in the scene near the user. Thus, if a user pans to the right then the animal or other content will appear to move to the left along with the other objects in the scene. In other embodiments, the virtual object may remain still and the user may obtain a view of the virtual object from a different perspective. Approaches for locating appropriate surfaces or locations for rendering AR content, as well as approaches for adjusting the rendered location based on movements of the device, are well known in the art and as such will not be discussed in detail herein.

FIG. 1 illustrates an environment 100 that may be utilized to start an AR experience by utilizing an object 102A, 102B (e.g., physical object), such as a box (e.g., packaging, cardboard box, storage box, etc.) or envelope (e.g., flat mailer, bubble mailer, bubble packaging) to generate and render AR content via an AR application. The illustrated objects 102A, 102B are positioned on a table 104 in the illustrated embodiment, but it should be appreciated that the objects 102A, 102B may also be arranged on the floor or any other location. For example, the object 102B may be positioned within a user's hand while the user utilized another hand to view and scan the object 102B, for example using a user device. Additionally, the illustrated object 102A is shown as a closed box, it is should be appreciated that the box may also be fully open, partially open, or any status in between. Similarly, the object 102B may be an open envelope, where a portion of the envelope is missing or may not be arranged near other portions of the envelope. Furthermore, while a box and a flat envelope are shown in FIG. 1 it should be appreciated that the objects 102A, 102B may also be a tube, a partial package, any other transportation item that may be used for packaging or shipment. Additionally, the illustrated box includes six sides and is generally closed, but it should be appreciated that the object 102A may include openings or cut outs, such as a cut out that enables visual inspection into the box.

The objects 102A, 102B include a tag 106A, 106B (e.g., visual marker), such as a logo, symbol, or the like, positioned on a side 108 of the object 102A and along a face 110 of the object 102B. It should be appreciated that the location of the respective tags 106 is for illustrative purposes only, and that the tags 106 may be arranged at a variety of different locations. Additionally, there may only be a single tag 106 or there may be multiple tags 106 on each face of the objects 102A, 102B. In the illustrated embodiment, tags 106A are arranged on each visible side of the object 102A. In various embodiments, each portion of the object 102 may include the tag(s) 106, and as a result, the position in which the user arranges the object 102 on the table 104 will not affect the experience. Furthermore, in various embodiments, the orientation of the tag 106 may be captured and registered by the device regardless of orientation. For example, in the illustrated embodiment, the tag 106B on the face 110 is upside down such that the "Smile" logo is written substantially in reverse and upside down. However, in various embodiments, metadata and the like associated with the tag 106 may still be registered, providing additional operations for the provider. As used herein, the tag 106 refers to a high contrast element that may be scanned by an electronic device to initiate an AR application and/or AR content. One example of a tag 106 is a QR code. However, it should be appreciated that the tag 106 is not limited to a QR code, a barcode, or the like. For example, the tag 106 may be integrated into the packaging or a label and may include high contrast areas, such as a dark area 112 next to a light area 114, arranged in a particular configuration. In other words, the arrangement of the high contrast areas (e.g. lighter areas by darker areas) may be considered the tag 106. In various embodiments, the tag 106 includes geometric shapes or unique shapes that may be used to trigger the AR application and/or the AR content via the AR application. The tags may be tied to specific AR content, based on the tag, or to specific users interacting with the tags. It should be appreciated that the tag 106 may be designed for recognition from a distance greater than recognition for traditional QR codes or barcodes. For example, the tag 106 may be recognized from several feet away while the physical object is displayed within the field of view of a user device.

Figure 2:
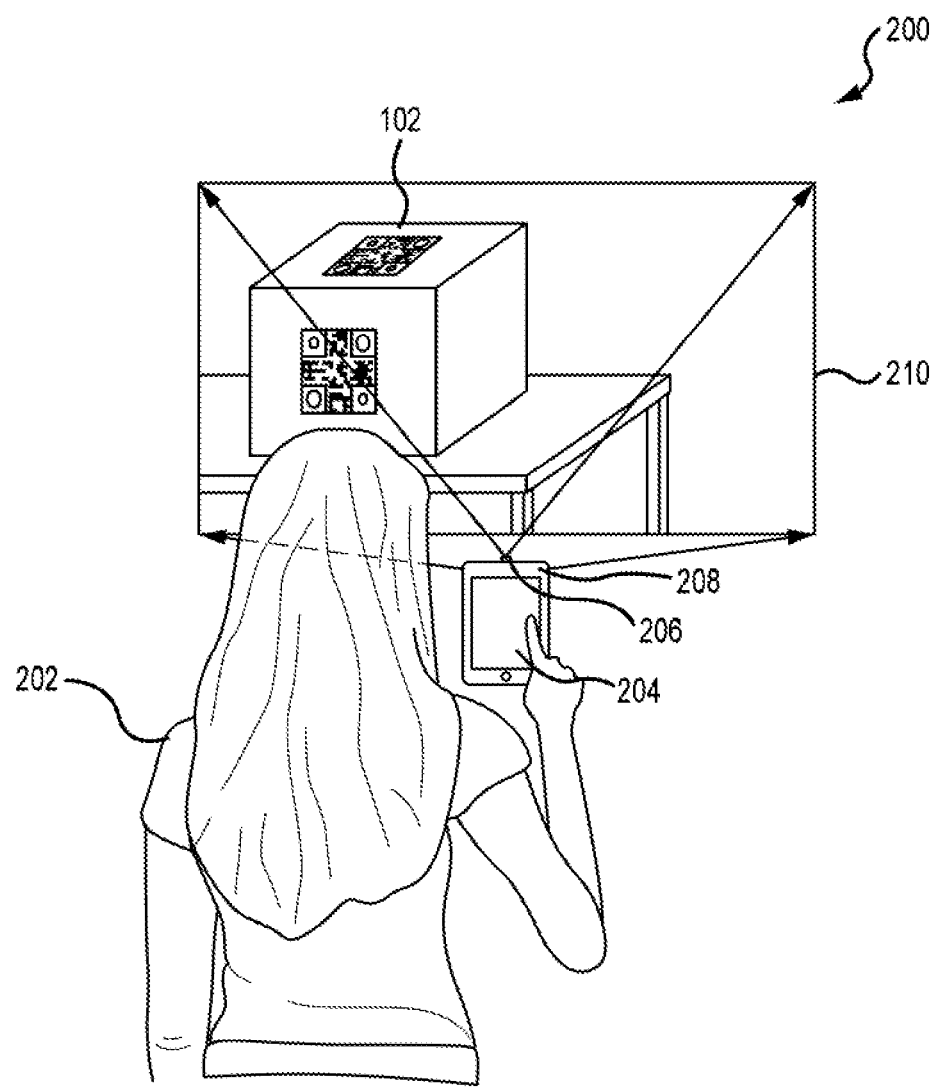
FIG. 2 illustrates an example approach to obtaining a field of view from a camera including a physical object for an AR environment in accordance with various embodiments.

FIG. 2 illustrates an example situation 200 wherein a user 202 is utilizing a portable computing device 204, such as a smartphone, to consume augmented reality content generated with respect to a physical scene, including objects visible from a location of the user and/or a camera of the device. As mentioned, although a portable computing device is illustrated this is only one of a number of different types of devices that can be used to provide augmented reality content within the scope of the various embodiments. The computing device 204 in this example includes a camera 206 and an IR transceiver 208 on a back face of the device, opposite a display screen on which the AR content will be rendered with respect to a live view of a portion 210 of the scene contained within a field of view of the camera of the device.

In the illustrated embodiment, the camera 206 captures image information, such as a digital image or frame of video. Additionally, image information may also be captured via the IR transceiver 208. The overlapping fields of view, along with calibration information for the relative locations of the camera and IR transceiver on the device, can be used to correlate the regions of infrared data with the objects in the scene. This can enable the device (or a system in communication with the device) to determine the reflectivity, or at least a relative reflectivity, of the various objects in the scene. It should be mentioned that the infrared image can be significantly smaller than the live image, being grayscale in at least some embodiments and potentially being lower resolution than the full image or compressed with respect to the full image, among other such options. In the illustrated example, the object 102 is positioned within the portion 210 of the scene and may be utilized to generate AR content, which will be displayed on the computing device 204.

There can be various situations wherein it may be desirable to render or provide augmented reality AR content to viewers through a number of different devices. For example, multiple players might be playing a multiplayer game wherein AR content is displayed to each of the players through a respective computing device. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

Devices used to access AR content can include any devices capable of rendering and/or displaying AR content, such as may include smart phones, tablet computers, smart glasses or contacts, VR headsets, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc. Each device can have a respective field of view that corresponds to a specific portion of the scene. For each device, only AR content corresponding to locations within that field of view will be rendered and displayed, at any given time, by a display of that device. In order to determine the angle and scale, as well as the point of reference for the field of view, the location of the device can also be determined. As mentioned, this can be determined using a GPS-based approach, or can use an iBeacon or triangulation-based approach, among others known or used for device location determination. The location information can help to determine the location of each device in the scene.

In order to make the AR content appear to be as realistic as possible, it can be desirable in many situations to further cause the rendered objects to appear to be positioned on, or with respect to, actual surfaces in the scene. This can include, for example, being positioned on a track, field surface, tabletop, or other object or element (physical or virtual) in the gameplay field. Further, it can be desirable that these objects are all of the appropriate scale and location with respect to each other, and that these relationships remain consistent unless intentionally varied within the game or content presentation. In order to provide such functionality, it can be desirable to map, model, or otherwise generate an accurate representation of the gameplay field, so that the content can be rendered appropriately with respect to that representation. While in some instances the field may be a fixed and well-known set of objects that does not change, in other instances the field may not be well known or may be able to vary throughout the game. In such situations, some amount of scene mapping using the relevant devices may be required.

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, data points determined from the captured image data can be analyzed to determine that there is a horizontal surface represented in the data. In response to detecting such a surface, and in some embodiments ensuring that various criteria are satisfied as may relate to size, angle, or smoothness, etc., a polygon or other geometric shape or construct can be generated. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. Based at least in part upon the position of the geometric construct, which would typically not actually be displayed on the screen but maintained as data in memory, can be used as a reference to render a character or other AR object or element as an overlay with respect to the live view. As the device displayed the content changes position or orientation, the respective position of the geometric construct will change as well. This change can trigger a corresponding change in the rendering of the AR element, to maintain a consistent scale, position, and angle with respect to the geometric construct.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

While many examples presented herein relate to gaming applications, various other AR applications can take advantage of improved accuracy in positioning of virtual objects and other such actions in a virtual environment as well. For example, in a sporting event such an approach can be used to render information on a track or playing surface. In a store, such information can be used to render pricing or product information, views of persons or characters wearing or using various products, etc. For tourism, such an approach can be used to render information or characters in various locations, in order to provide information about the location or site. Various other approaches can be used as well, in situations where it is desired to render at least some amount of AR content, but the size of the space is too large for any single device to accurately map or determine the position and other distant information.

Figure 3:
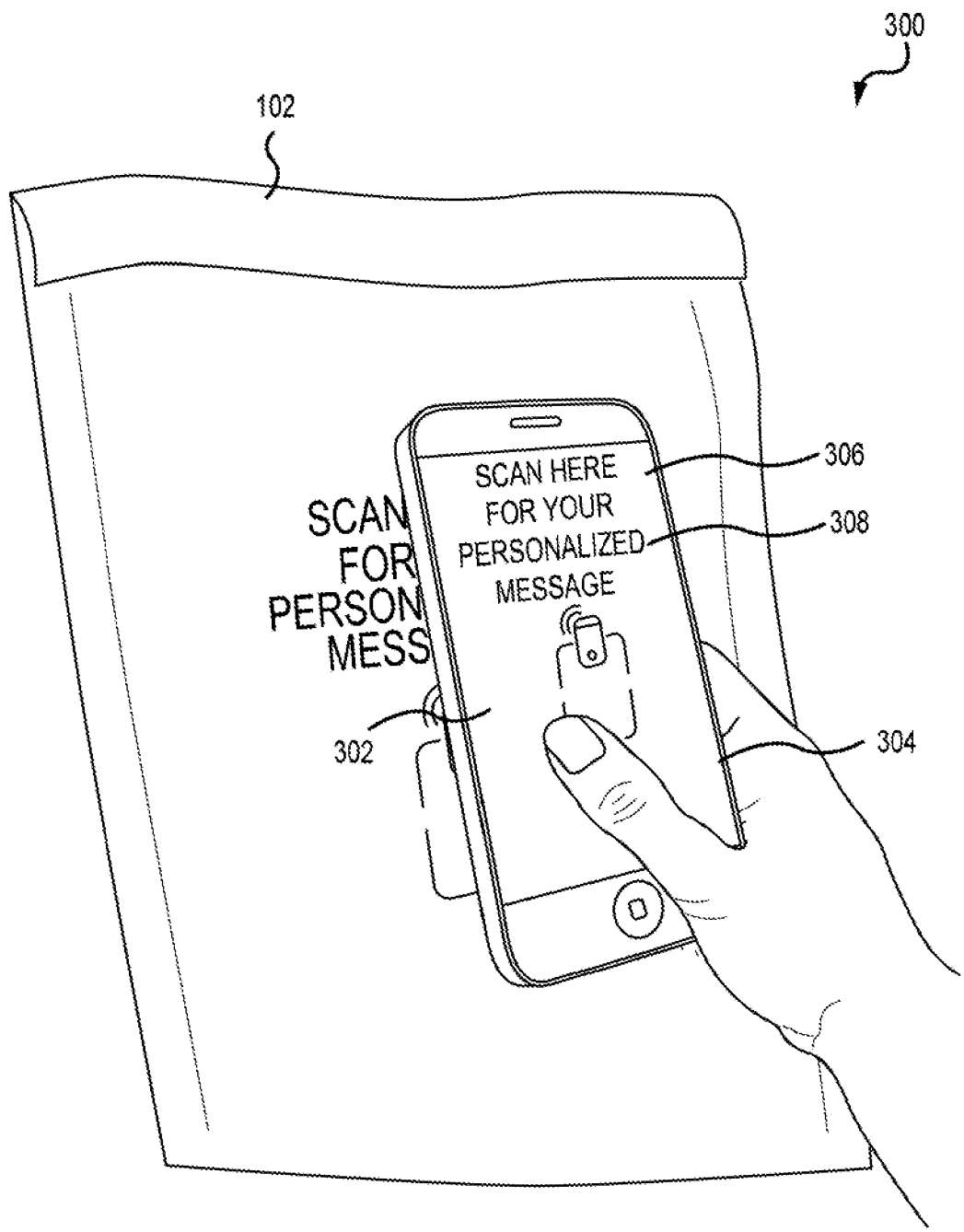
FIG. 3 illustrates an example situation including a field of view of an object including a tag for use in an AR environment in accordance with various embodiments.

FIG. 3 illustrates an example situation 300 of a portion of the object 102 as viewed on a display 302 of a computing device 304. In the illustrated embodiment, the object 102 may correspond to the envelope bubble mailer of object 102B illustrated in FIG. 1. As noted above, in various embodiments different types of mailing or shipping packaging may be utilized, such as bubble mailers, boxes, tubes, and the like. In various embodiments, an AR application 306 executes to scan the object 102, for example via a camera integrated into the device 304. A tag 308 is illustrated on the display 302, which may trigger AR content. As described above, the tag 308 may correspond to an object with high contrast (e.g., light areas proximate dark areas) that provide a trigger for the AR application 306 to determine appropriate AR content, for example, via evaluation of a user account associated with the computing device 304 and/or the AR application 306. In various embodiments, the object 102 may include a generic tag 308, for example a common tag that may be reproduced on a number of different packaging options, and the AR application 306 will determine, by linking to the user's account, may determine the AR content to be associated with the object 102. Advantageously, campaigns may be quickly deployed by utilizing a generic or repeatable tag and associating information with particular user accounts. For example, a logo may be utilized as the tag. As a result, packaging may not include extensive coloring or different templates, which may become obsolete prior to utilizing all of the stock.

While the illustrated embodiment includes the tag 308 occupying a large portion of the display 308, in other embodiments, the tag 308 may be recognized from a greater distance, for example, due to the high contrast nature that enables identification by the AR application 306. However, it may be more convenient for the user to hold the object 102 close, such as when the object 102 is a small or lightweight item. The user may load the AR application 306 on the computing device and the AR application 306 may scan the object 102 to determine whether the tag 308 is present. For example, the AR application 306 may acquire the object 102 within a field of view and analyze sections of the image to determine whether the tag 308 is present. Upon recognizing the tag 308, the AR application 306 may communicate with a server, or the like, to determine whether applicable AR content is associated with the tag 308. For example, the AR application 306 may be linked to a user account and, upon detection of one or more tags 308, different types of AR content may be presented to the user.

In various embodiments, the user may receive a notification directing or encouraging them to scan the tag. For example, as will be described below, AR content associated with the tags may be tied to user accounts, which may provide notifications such as package delivery status for users that have selected to receive such message. As a result, when the user receives the package, the provider may transmit a message informing the user that the package is associated with AR content, which may encourage the user to scan the package. Accordingly, the user receives the benefit of the AR content, even if it is an unexpected benefit.

Figure 4:
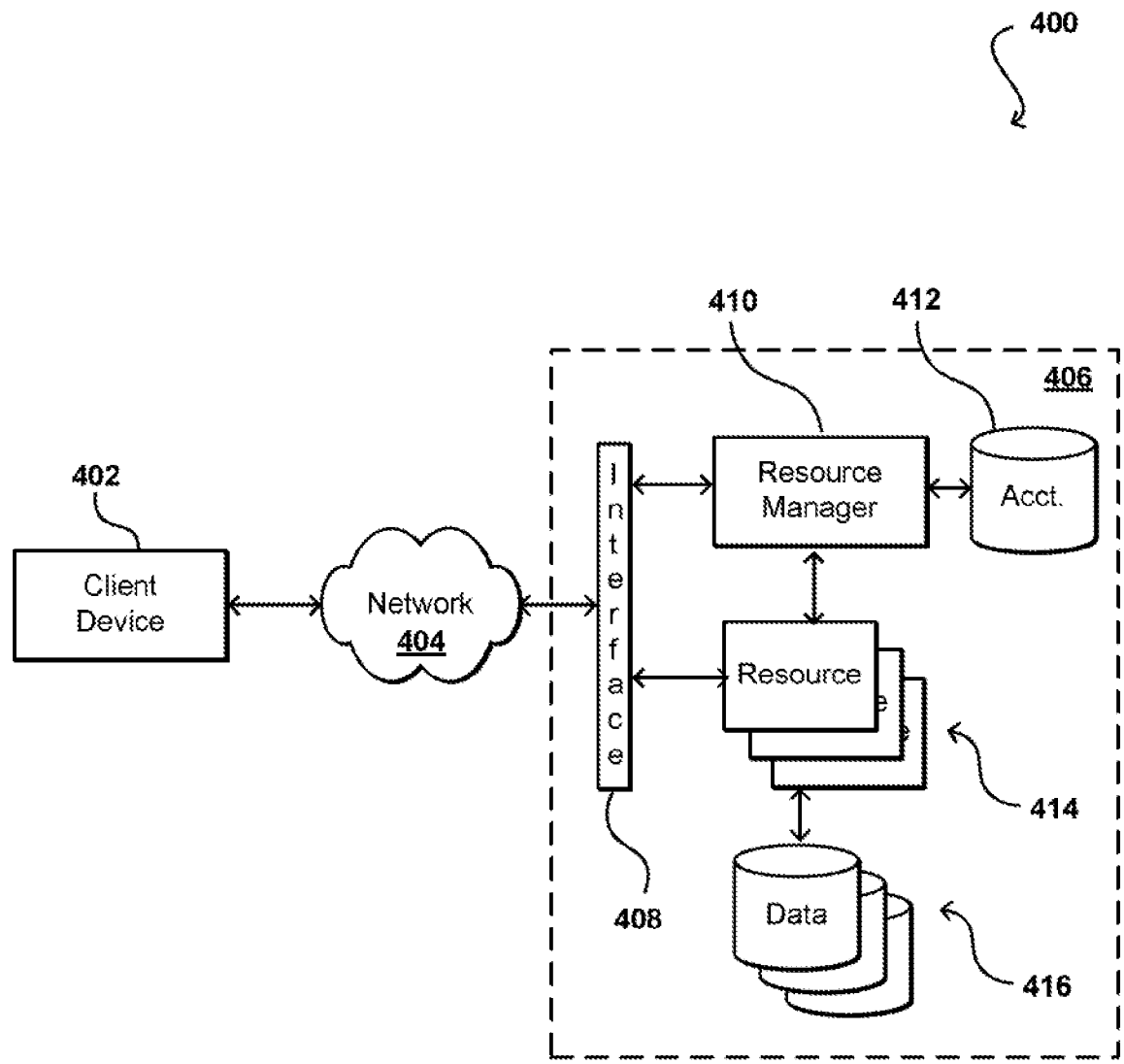
FIG. 4 illustrates an example environment in which various embodiments can be implemented.

As described above, in various embodiments, a provider, such as a provider of an online marketplace or a provider of one or more items for purchase, may generate the AR content for the benefit of the user. Also, in embodiments, third parties, on behalf of the provider, may generate and host the content. FIG. 4 illustrates an example environment 400 in which aspects of the various embodiments can be implemented. In this example, a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, wearable devices, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
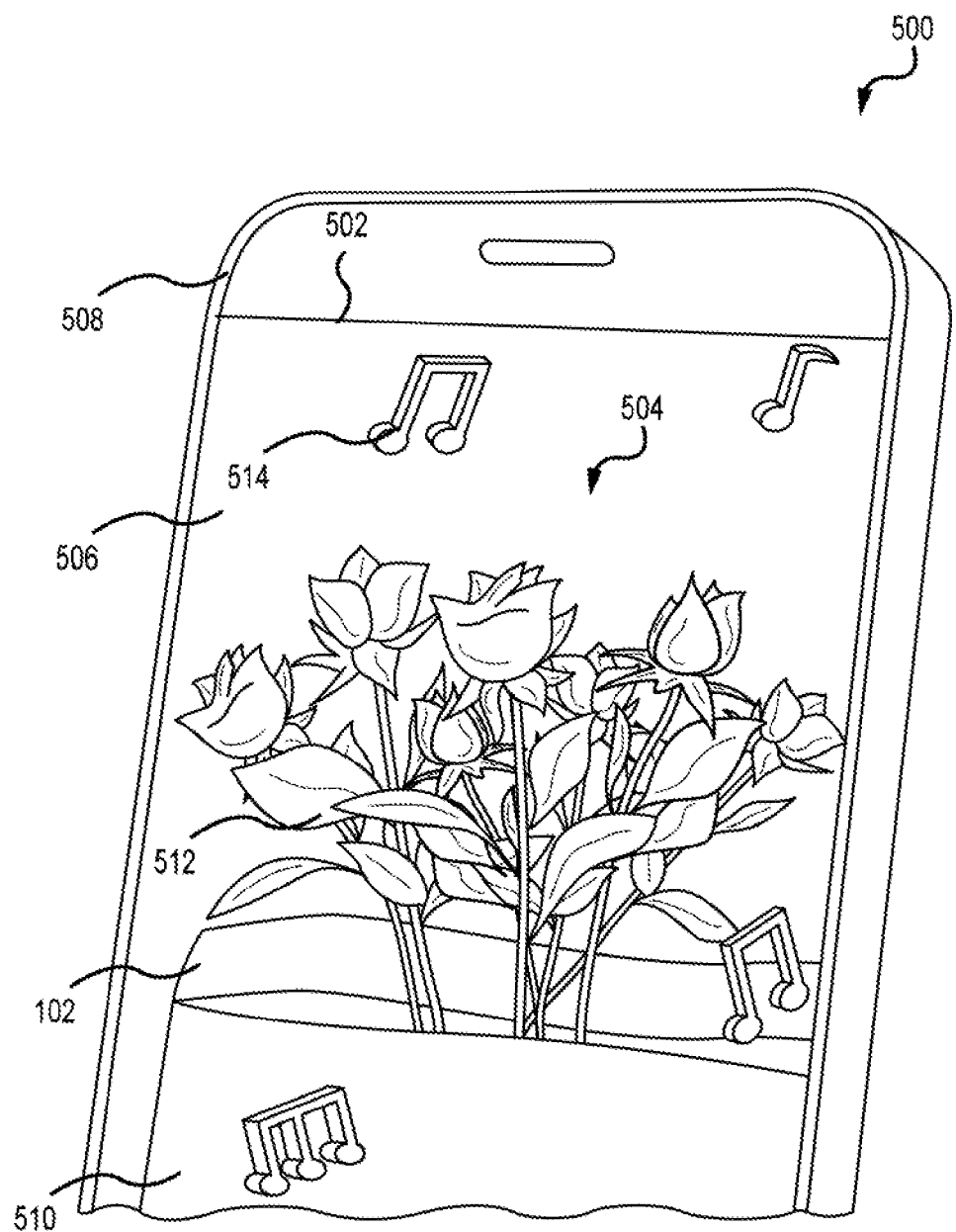
FIG. 5 illustrates an example situation of AR content presented in an AR environment in accordance with various embodiments.

FIG. 5 is an example situation 500 where an AR application 502 loads AR content 504 onto a display 506 of a computing device 508. In various embodiments, the AR content 504 is generated and/or displayed in response to detection of a tag (such as the tag 308 of FIG. 3), appropriate permissions, and the like, as will be described below. The illustrated AR content 504 is directed toward an animation that may be part of a personalized message associated with a user account of the recipient.

In the illustrated embodiment, a portion of the object 102 is incorporated into the AR content 504. The object 102 may be rendered as a first AR content element 510 that is a representation of the object 102 in the form of an envelope, which may be a bubble mailer. Further illustrated is a second AR content element 512 representative of flowers extending out of the first AR content element 510. In other words, an action associated with the first AR content element 510 (e.g., opening of the envelope) is incorporated into the animation for the AR content 504. Additionally, a third AR content element 514 is included in the form of an auditory element, such as music, a sound, a voice recording from the sender, or the like. In various embodiments, the AR content 504 may include an animation of the first AR content element 510 opening to reveal the second AR content element 512 extending outward from the envelope while the third AR content element 514 plays a message, sound, or song. In other words, the various AR content elements may interact with one another to provide an integrated, cohesive product for the user. In various embodiments, the AR content 504 may be pre-selectable by a first user that associates the object 102 with the AR content 504, via an account of the recipient user. In other words, the provider may present options to the first user, such as options stored within a database accessible to users of the provider's services.

In various embodiments, the AR content 504 is provided along with an item or package that is delivered to a user. The user may opt into receiving items, for example from other users, and may also control or restrict data that the other users may see. For example, the user may establish a gift registry and block their address from view of the other users. The utilizing of AR content may be provided in place or, or in addition to, other types of specialized content, such as gift wrapping services. The AR content provides advantages over traditional gift wrapping, such as fewer restrictions since gift wrapping may be limited by certain combinations of colored paper, ribbons, etc. Furthermore, personalized messages provided along with AR content may be more private than messages with gift wrapping because a person may be packaging the physical message and may inadvertently see the message, even with privacy enhancing policies in place. Furthermore, a provider may endeavor to provide frustration free or eco-friendly packaging, which may reduce the amount of packaging used or incorporate shipping items in packaging provided by original manufacturers. Incorporating gift wrapping or other services may be challenging when trying to meet these needs, and as a result, a box or item may be packaged within a similarly sized package, which may waste resources.

As described above, in various embodiments additional information may accompany the AR content 504, such as a message or the like. For example, a link may be provided between the sender and the recipient such that information between the accounts is associated with the message. By way of example, when a first user designates a message for transmission to the second user, the tag may be associated with both the message and the second user, via the second user account. Accordingly, the message is linked to receiving information from the second user that includes the tag. In other words, the message may be stored and provided to the second user upon verification that the tag and the second user both correspond with identification information provided by the first user.

In various embodiments, both the first user and the second user may be associated with a shared user account. For example, the first user and the second user may live together and share an account, but may still benefit from the services. Accordingly, in embodiments, if the first user is sending the content, the first user may specify the second user as the recipient, and the information will be tied to the shared account. In various embodiments, the shared account may be configured to transmit messages to the individual users of the account. In this manner, the recipient user may still receive a message informing them of their pending content.

Figure 6:
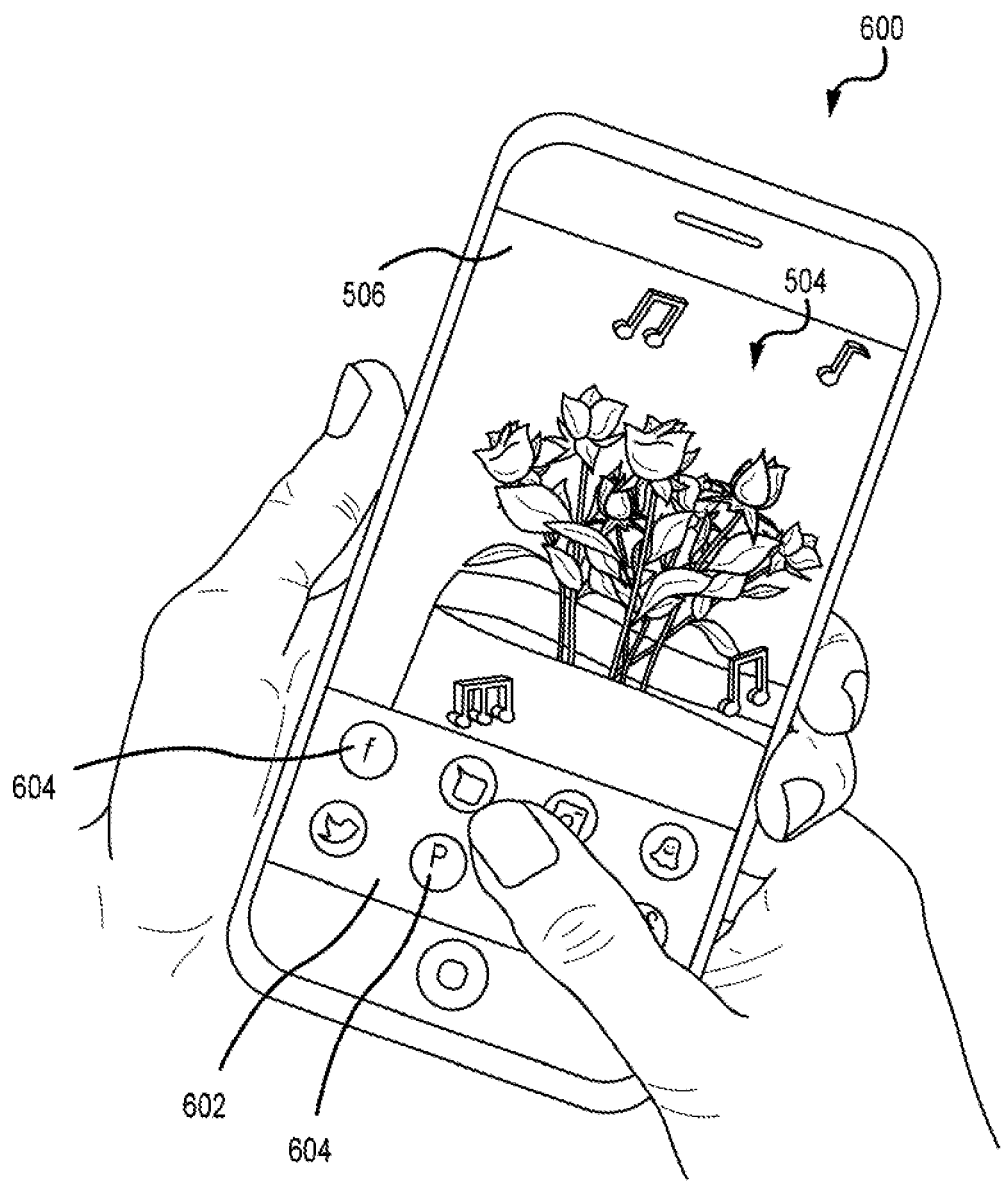
FIG. 6 illustrates an example situation of AR content presented in an AR environment in accordance with various embodiments.

FIG. 6 is an example situation 600 including the AR content 504 from FIG. 5. In the illustrated embodiment, a user menu 602 is included on the display 506 to enable the user to perform one or more actions associated with the AR content 504. For example, various selectable icons 604 may correspond to different actions, such as sharing the AR content 504 via various social media platforms, text messaging platforms, and the like. Upon providing permission to access the user's accounts, the AR application 502 may enable sharing, such as posting, of the AR content 504, which may also include personalized messages provided by the user that shares the content. In certain embodiments, a pre-loaded message may be provided, which may include identification of the provider. Additionally, in embodiments, a logo or other feature associated with the provider may also be included. As a result, other users may see the content available from the provider and be encouraged to try the services.

In certain embodiments, users may be encouraged or otherwise rewarded for utilizing social media integration. For example, upon receipt of permission from the user to link social media platforms to their account, the application may generate posts and social media content that the user may use with their account. In various embodiments, a draft message may be generated, which may include hashtags or other tracking elements, to enable monitoring trends with media postings. For example, Smile Company's AR content may have a specific tag that the company may use to evaluate the social media impact of their AR applications. As a result, a user's activity on social media may be tied to the AR content. In various embodiments, the user may be encouraged or rewarded for integrating the social media platforms. For example, if the user posts a threshold amount of content, the user may be rewarded with additional AR content or the like. Additionally, if the user's posts reach a threshold number of comments, shares, likes, etc., the user may also be rewarded.

Figure 7:
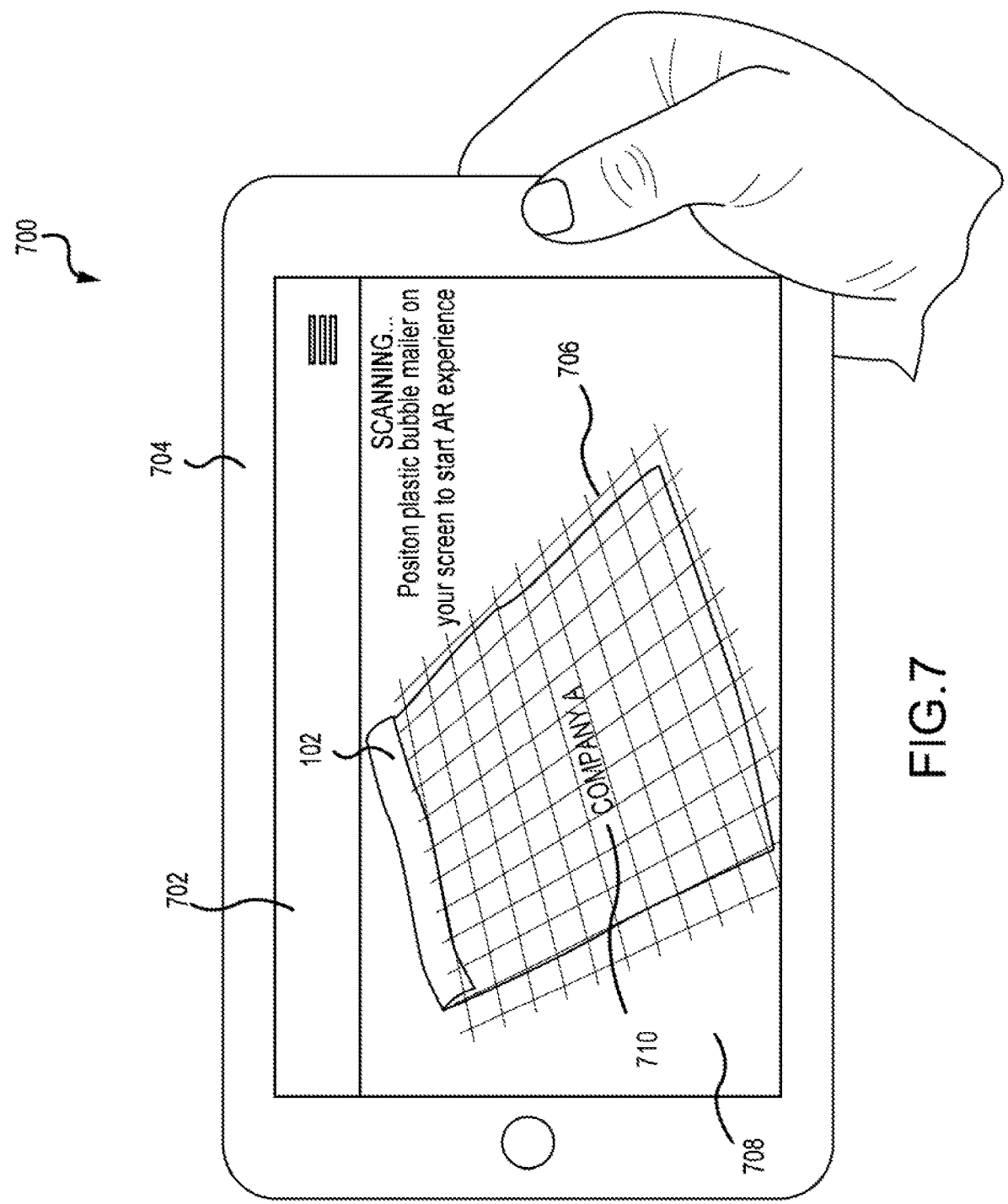
FIG. 7 illustrates an example situation including a field of view of an object including a tag for use in an AR environment in accordance with various embodiments.

FIG. 7 is an example situation 700 where an AR application 702 receives image information representative of the object 102 for generation of AR content. In the illustrated embodiment, the object 102 is representative of a bubble mailer, or an envelope, that may be scanned using a computing device 704, for example via a camera. In various embodiments, a mapping or range 706 may be superimposed on the display 708 to assist the user with lining up the object 102 for identification. The AR application 702 may be utilized to recognize a tag 710, which may correspond to particular AR content. For example, the tag 710 may include a logo or the like, representative of the provider, which may have high contrast areas to facilitate identification. Moreover, the tag 710, in combination with features of the object 102, may also be used to generate AR content.

In various embodiments, the mapping 706 may be tied to a particular region of the object 102, to the entire object 102, or some combination thereof. For example, the mapping 706 may represent boundaries of an object, which may be tied to particular AR content associated with that object and/or to a user associated with the object. In various embodiments, the mapping 706 may be utilized to generate an initialization point, such as an area in space represented by an x-y-z coordinate. In embodiments, metadata incorporated with one of the object or the tag may be used to obtain scaling and size information, as well as particular AR content. For example, a user may receive two objects, one that includes AR content and one that does not. In embodiments, each may include similar or the same packaging. However, because AR content may be tied to particular objects and/or the user accounts, scanning the objects may produce different results. For example, if the objects are a different size, scanning the objects in their entirely (or substantially their entirety) may provide information as to which is associated with the AR content. Furthermore, in embodiments, the AR content may differ by size and/or packaging type, among other potential options. As a result the mapping 706 may be used to identify features of the object, the tag within the object, and/or to differentiate between objects associated with AR content and objects that are not associated with AR content.

In an embodiment, the provider of the AR application 702 may correlate particular AR content to different types of objects 102. For example, the AR application 702 may communicate with a server that includes information, such as object information, that may include dimensions of the object 102. Additionally, the object information may include visual representations of the object 102, which may be used with computer vision techniques to recognize the object 102. As a result, AR content that may be associated with particular objects 102 may be presented on the display 708 for the user.

In various embodiments, the AR application 702 may be tied to a user account. The user account may include purchasing information, such as from an online marketplace. This information may also include shipping information, for example a type of packaging utilized to ship the items to the user. As a result, when the user loads the AR application 702, the AR application 702 may receive information regarding the type of packing to scan for and/or features of the packing to recognize. This may reduce processing and data transfer because the AR application 702 may begin retrieving the information without fully scanning or recognizing the package, based on the provided information. Accordingly, various types of information or features may be provided to the user without the constraints of the size of the packaging. For example, the user may retrieve advertisements, recommendations, product information, educational information, or the like.

Figure 8:
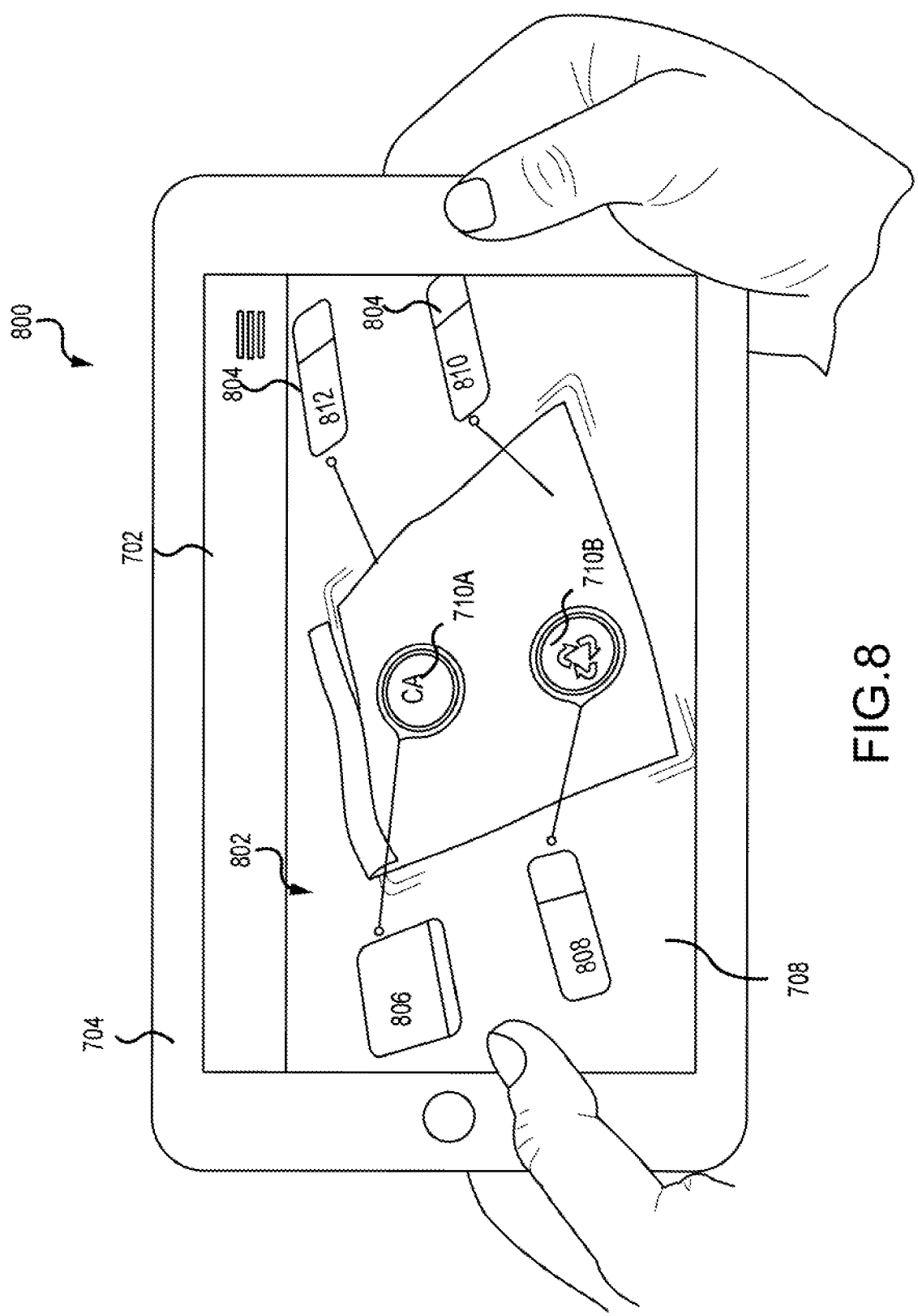
FIG. 8 illustrates an example situation of AR content presented in an AR environment in accordance with various embodiments.

FIG. 8 is an example situation 800 where the AR application 702 loads AR content 802 onto the display 708 of the computing device 704. In the illustrated embodiment, the AR content 802 includes selectable icons 804 to provide information to the user. The selectable icons 804 may include links that, when selected, may guide the user to a different page or present an overlay with information. The information may be educational information, such as providing news regarding the provider, the user's actions with respect to the provider, or the like. Additionally, the information may provide insight to the customers, such as where they may recycle the object 102, or alternative uses for the object 102. Furthermore, the selectable links may be associated with the user account to enable the user to provide a customer review or feedback.

In the illustrated embodiment, the tag 710A is recognized via the AR application 702 to launch at least a portion of the AR content 802. For example, the AR content associated with the tag 710A may be directed toward information about the provider. In various embodiments, the information is unique to the user, for example, the user account associated with the AR application 702. For example, the user's history or volunteered information may be utilized to present information. By way of example, the user may have a history of purchasing products related to travel. As a result, the information may include information about global locations for the provider. Additionally, in the illustrated embodiment, a second tag 710B may also be recognized, which may be tied to different information. For example, the second tag 710B may be a recycling symbol, which may lead to information about recycling or reducing waste.

The illustrated embodiment includes four selectable icons 804, but it should be appreciated that more or fewer icons may be presented. The selectable icons 804 may include links that, with permission, take the user to a different page or program. Additionally, the selectable icons may generate overlay or other information for presentation on the display 708. For example, an information icon 806 may be related to information about the provider. The information icon 806 may be tied to the provider, for example, a logo represented by the tag 710A. The information icon 806 may provide a selectable element that includes information about the provider or other types of information that the user may find interesting or entertaining.

Further included in the illustrated embodiment is an environmental icon 808, which may provide information regarding recycling of the packaging. For example, upon selecting the environmental icon 808, the user may receive information regarding a type of material the packaging is formed from and potential recycling options. As will be described below, in various embodiments, the information may be particular to a region where the user is located. In the illustrated embodiment, the environmental icon 808 is associated with the second tag 710B, which is illustrated as a recycling symbol.

Further illustrated are a customer experience icon 810 and social responsibility icon 812. In embodiments, the customer experience icon 810 may enable the user to provide a review for the items obtained within the packaging or to comment on the quality of packaging itself. As described above, in various embodiments, the AR application 702 is associated with a user account. As a result, as the user enables the AR capabilities associated with the object 102, information from the user account may be utilized to enable the user to continue to interact with the provider. For example, information from the user account may be related to the items arranged within the object 102. Accordingly, as the user selects the customer experience icon 810, the user may be presented with options to provide reviews for the items provided with the packaging. Moreover, the social responsibility icon 812 may provide educational information to the user, such as information about reducing energy consumption, how the user's purchases are impacting social programs, and the like.

In various embodiments, the AR application 702 may provide an opportunity for the user to continue to interact within an ecosystem of the provider. For example, the provider may grant access to the AR application 702 and also provide the object 102 to the user. Further engagement may provide an improved customer experience, as the user may quickly provide feedback regarding their items, packaging, shipping items, and the like. By providing this ability upfront to the user, the user may be more inclined to participate, rather than logging in on a different application and then navigating to the appropriate sections. In various embodiments, the provider may also give an incentive for participating, such as providing coupons or prizes for leaving reviews or watching educational content. In this manner, the user's engagement with the provider may increase while also giving the user an improved experience.

In various embodiments, AR content may be presented in layers with multiple different tags providing a different or more immersive experience. For example, a first tag may be utilized to launch the AR application and then one or more sub-tags may be included to provide additional content. For example, with respect to FIG. 8, the tag 710A associated with the company logo and/or the mapping and evaluation of the object may be utilized to launch the application. Thereafter, different tags, such as the tag 710B may be sub-tags utilized to provide additional information, such as the recycling information in the illustrated embodiment. Accordingly, the first tag may be utilized as a guide for the system to recognize additional tags and/or metadata that leads to more content for the user. In embodiments, objects and/or tags may be particular to different types of packaging options. For example, mailers that are formed from recyclable material may include a first tag to launch the experience and a second tag to provide recycling information to a user. In another example, packaging options associated with gifts may include a first tag to launch the experience and a second tag to provide a message. As a result, the packages may be more used for a variety of different scenarios, because different combinations of tags and metadata may be used to present a variety of different content options.

Figure 9A:
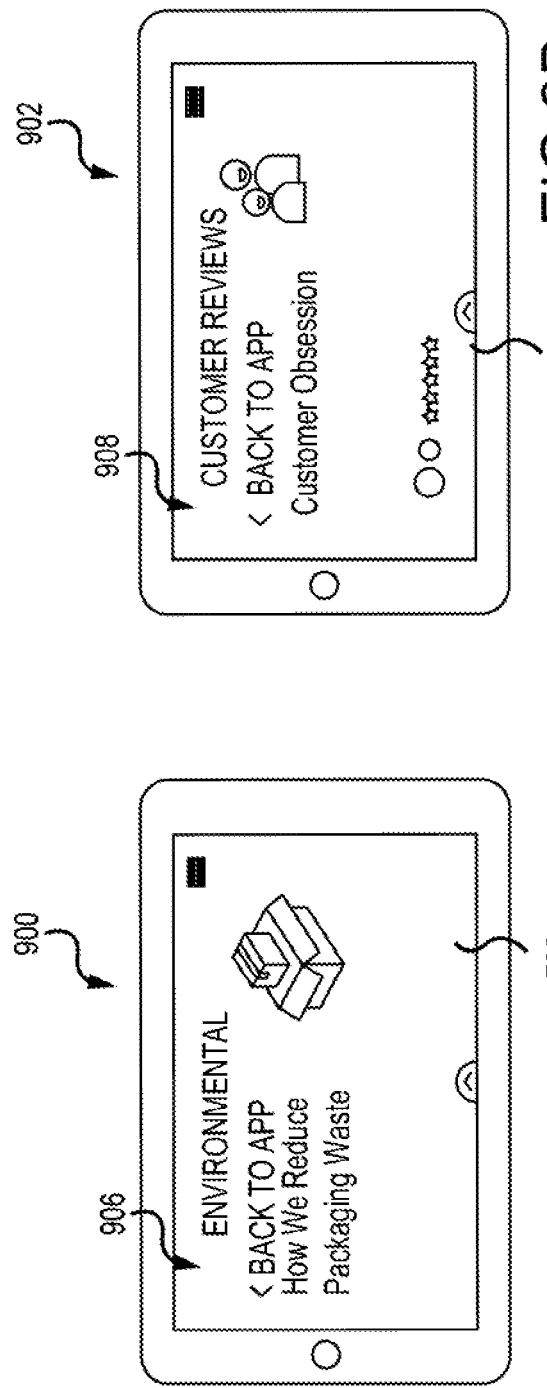
FIGS. 9A-9C illustrate example situations of AR content presented in an AR environment in accordance with various embodiments.
Figure 9B:
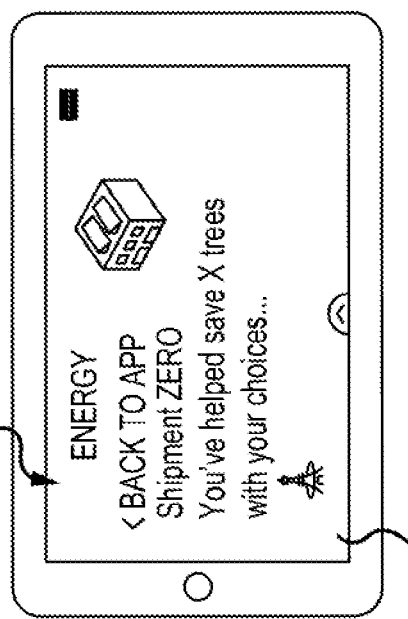
Figure 9C:
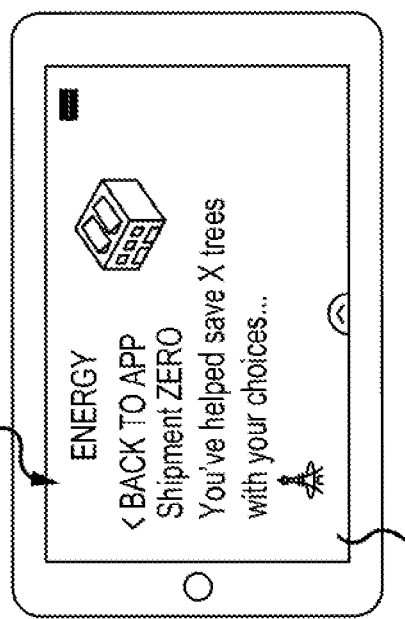

FIGS. 9A-9C are example situations 900, 902, 904 of information presented via the display 708 in response to a selection of a selectable icon 804. In various embodiments, the situations 900, 902, 904 may be presented as new windows, for example, windows that are arranged over the AR content 802. However, in other embodiments, the AR content 802 may launch a different application or the like. In the example illustrated in situation 900, information is presented to the user in response to selecting the environmental icon 808. In the illustrated embodiment, the situation 900 includes environmental content elements 906, which include graphics, text, and the like. For example, the illustrated environmental content elements 906 include a graphic illustrating how waste is reduced to ship the object 102. In embodiments, text and graphical elements, which may be scrollable and separately navigatable, may be included within the environmental content elements 906. Accordingly, the user may obtain information regarding environmental programs being implemented by the provider. Advantageously, this may drive good sentiment toward the provider or inform the user to make certain decisions later. For example, the provider may include options for more environmentally friendly packaging, which the user may select when making purchases through an online marketplace. By providing knowledge of this packaging to the user, the user may be more likely to make the informed decision with their next purchase. Additionally, providing the information to the user now, at the unboxing or unpacking stage, may also drive improved interaction with the content. For example, the user may be more likely to prepare the packaging for recycling if the user has information regarding recycling and also is currently handling the packaging and determining how to proceed. Similarly, the user may be more likely to leave feedback regarding the packaging right when the user is interacting with the packaging. In other words, the barrier to interaction is reduced because the user, at this moment, has already interacted with the packaging using their device and can provide information without extra steps, such as logging in from a different device.

The situation 902 illustrates customer experience content elements 908 in response to a user selecting the customer experience icon 810. In the illustrated embodiment, the customer experience content elements 908 include options to leave product reviews, such as textual reviews or a star rating for various products. As described above, user engagement may be increased by integrating the option to provide the reviews along with the AR content. For example, the user is already utilizing the provider's ecosystem by using the AR application, and as a result, a barrier to accessing other parts has been removed. The user may now quickly provide product reviews or feedback regarding packaging, among other options. In this manner, the user may stay engaged with the provider and provide information that may improve future experiences for the user or other users.

The situation 904 illustrates social responsibility content elements 910 in response to a user selecting the social responsibility icon 812. In the illustrated embodiment, the social responsibility content elements 910 include options to receive information regarding ongoing campaigns, to find out how the user can contribute to campaigns, and the like. For example, in this embodiment, the user is presented with information how their choices, such as selecting environmentally friendly packaging, have affected the environment. As noted above, the user may be more willing to interact and receive this information when already utilizing the AR application, rather than seeking it out at a later time. Moreover, customer feelings toward the provider may be improved in response to seeing social responsibility programs, which may provide more loyalty or a better experience for the user.

It should be appreciated that the embodiments and examples for information that the provider may include are for illustrative purposes and other types of information or icons may be provided. Furthermore, each of the situations 900, 902, 904 and others may include additional clickable elements, among other graphical features such as videos, animations, graphics, sounds, and the like. Additionally, information may be particularly selected based on the user account associated with the AR application. For example, the user's interests may be utilized to select the various selectable icons. Additionally, the user may provide information to curate the information provided and may also restrict or otherwise control how the information is provided.

Figure 10:
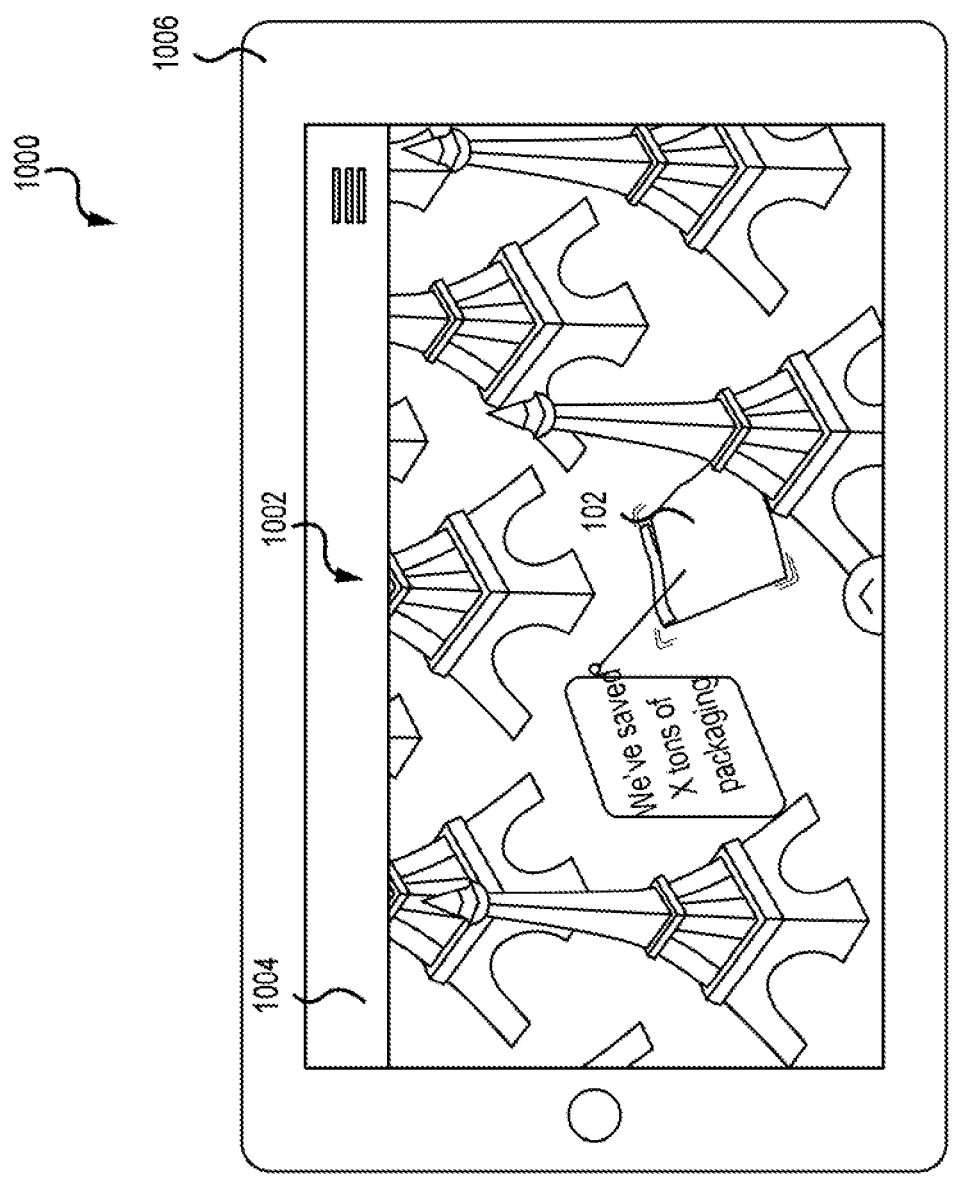
FIG. 10 illustrates an example situation of AR content presented in an AR environment in accordance with various embodiments.

FIG. 10 is an example situation 1000 of AR content 1002 displayed via an AR application 1004 executing on a computing device 1006. The illustrated AR content 1002 is utilized to provide visualization in order to educate a user and provide an improved experience. For example, information such as "we've saved 244,000 tons of packaging material" may be difficult for a user to visualize. While the user may realize that is a significant amount, the information may prove more useful if the usual can visualize or relate the information. Accordingly, the illustrated AR content 1002 includes a plurality of Eiffel Tower renderings arranged about the object 102. For example, the "244,000 tons of packaging material" may correspond to 35 Eiffel Towers. As a result, 35 renderings of the Eiffel Tower may be provided. This enables the user to tie their impact to the experience of using the application. However, fewer renders may be provided and the number may be provided such that the user can visualize their impact, which may provide a beneficial experience for the user. In various embodiments, different content may be provided in order to help users visualize other aspects of the provider's network. Such as equating a distance traveled to trips back and forth from the moon or time spent consuming media as a function of years. In this manner, the user may be educated in a fun and engaging way, which may lead the user to further experiences via the AR application 1004. In various embodiments, the AR content 1002 may include selectable elements that enable the user to obtain additional information about the element, for example, by linking to a partner webpage. The user's response to the AR content 1002 may also be used to learn more about the user's interests, which may be used to update the associated user account. Accordingly, the user's experience may be personalized when the user uses the AR application 1004 for another reason.

Figure 11:
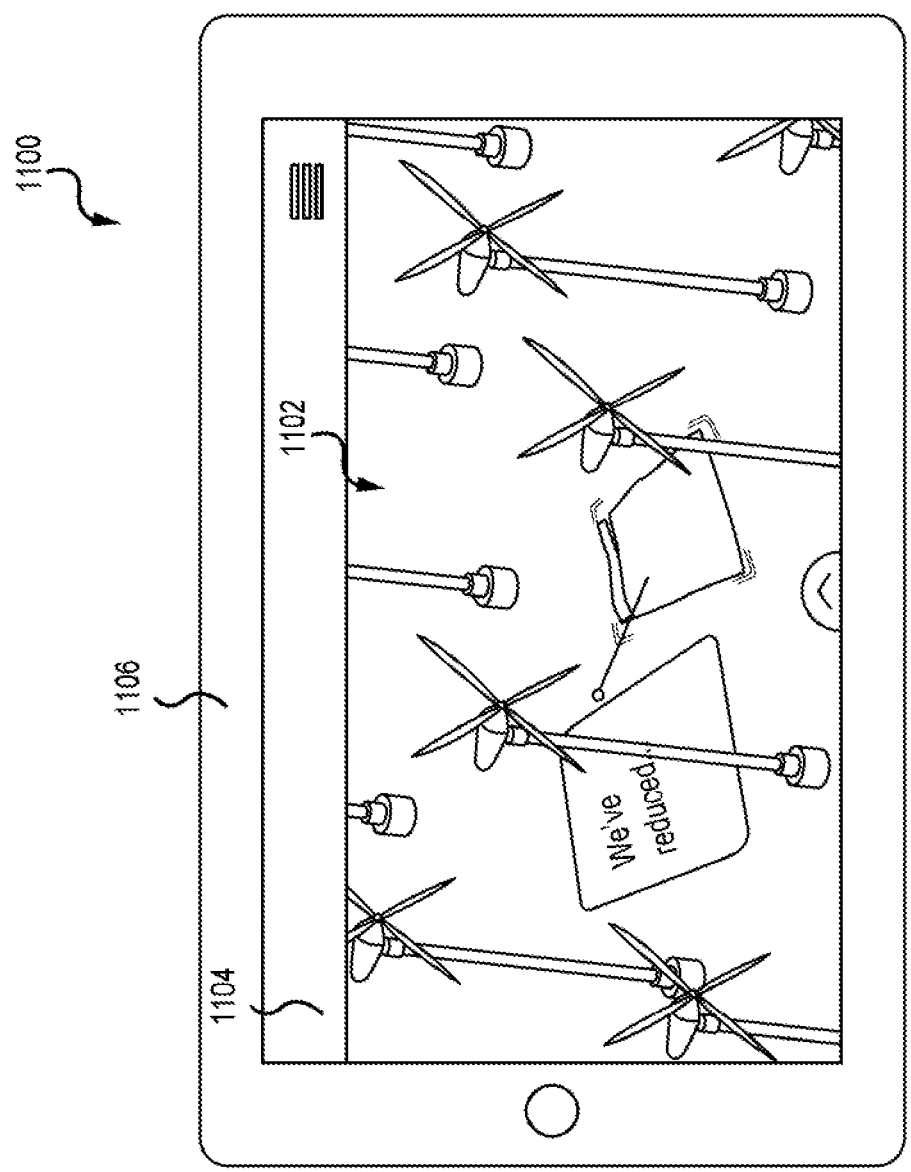
FIG. 11 illustrates an example situation of AR content presented in an AR environment in accordance with various embodiments.

FIG. 11 is an example situation 1100 of AR content 1102 displayed via an AR application 1104 executing on a computing device 1106. The illustrated AR content 1102 is also utilized to visualize a large quantity to educate and provide an improved experience for a user. For example, information such as "we've reduced our energy consumption by X" may be difficult for a user to visualize. While the user may realize that is a significant amount, the information may prove more useful if the usual can visualize or relate the information. Accordingly, the illustrated AR content 1002 includes a plurality of wind turbine renderings arranged about the object 102. For example, the energy conserved may correspond to 500 wind turbines. As a result, renderings of wind turbines may be provided. Various different components may be provided in order to facilitate educating and providing information to the user. For example, the embodiment of FIG. 11 may be provided as an alternative to the embodiment of FIG. 10. That is, the user can learn information about waste reduction in FIG. 10 and then learn what that means in terms of energy consumption in FIG. 10. Accordingly, improved sentiment toward the provider may be provided while still providing an entertaining platform for the user.

Figure 12:
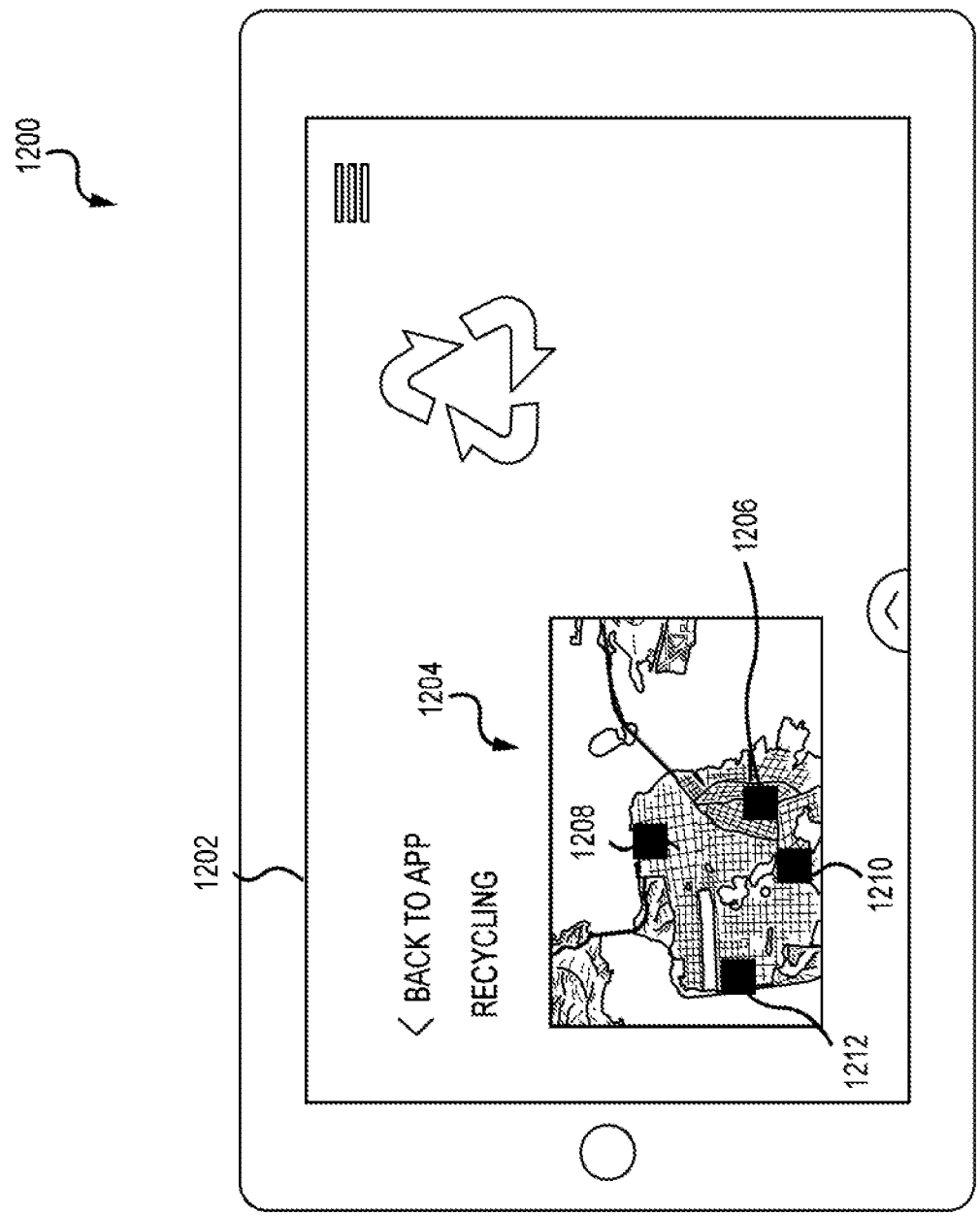
FIG. 12 illustrates an example situation of AR content presented in an AR environment in accordance with various embodiments.

FIG. 12 is an example situation 1200 where an AR application 1202 provides personalized content to a user based, at least in part, on user information such as a user's location. For example, in the illustrated embodiment, the AR application 1202 may be utilized to provide information related to recycling the object 102, such as in response to the user selecting the environmental icon 808. In various embodiments, a user may be curious regarding recycling of the packaging, for example, due to rules for their municipality and/or the location of various recycling centers. That is, the user may be willing to recycle their packaging, but may not know if their region does that type of recycling or where recycling occurs. Additionally, the user may not know if the packaging even if recyclable. However, embodiments of the present disclosure may be used to provide this information to the user in a customized or particularized manner. For example, the user's location may be determined, such as via a GPS device integrated into the computing device, and rule and recycling information may be evaluated and presented to the user. As a result, the barriers to recycling may be reduced, which may encourage the behavior for various users.

As described above, the user may scan the object 102 via the AR application 1202. The object 102 may be analyzed, for example via one or more tags on the object 102 and/or based on stored information, such as user purchase information or computer vision information to identify the object 102. In certain embodiments, the object 102 may be identified as packaging, which may be used to ship items ordered from an online marketplace. The packaging may be formed from a variety of different materials, such as cardboard, plastics, and the like. These materials may include recycling codes that identify the composition of the packaging, which may influence potential recycling locations. However, it may be challenging for a user to know which center is appropriate. Also, it may be time and/or labor intensive for the user to find out, which may lead to the user merely throwing the package away.

In the illustrated embodiment, a map 1204 is generated that includes a user location 1206 and recycling center locations 1208, 1210, 1212. Moreover, information about the packaging, such as its composition, may also be provided. The recycling center locations 1208, 1210, 1212 may include selectable icons that the user may select in order to provide additional information. For example, the selectable icons may lead to a page that provides hours of operation for the recycling centers 1208, 1210, 1212. Accordingly, the user may receive additional information to help them make an informed choice regarding what to do with the packaging after they have received the ordered item. As a result, the information is presented when it may be highly useful to the user, such as when the user is deciding how to sort the item, rather than before the user receives the item or after the fact. As noted above, this reduced the barrier to interaction for the user because the information may be presented when it is easy or convenient for the user to act on it.

In various embodiments, local ordinances and the like may be made accessible to select the appropriate recycling centers. For example, certain centers may only accept glass while others only accept paper. Accordingly, listing all of the centers would be unhelpful to the user because the user would be unhappy to travel to a center and learn that their items were not accepted. As a result, the AR application 1202 may, at least in part, determine a composition of the packaging and then select an appropriate recycling center based on a variety of factors, such as distance from the user, and the like. Furthermore, historical information from the user account, such as authorized tracking information, may be utilized to determine which centers the user may also visit and provide a notification to the user. It should be appreciated that, in various embodiments, the user may select to remove information or block the AR application 1202 from accessing certain information. Accordingly, location information and the like may be "opt in" or ask for authorization prior to determining the user's location and providing information based on that location. In this manner, the user may control the information received by the provider and may choose to receive the personalized services.

Figure 13:
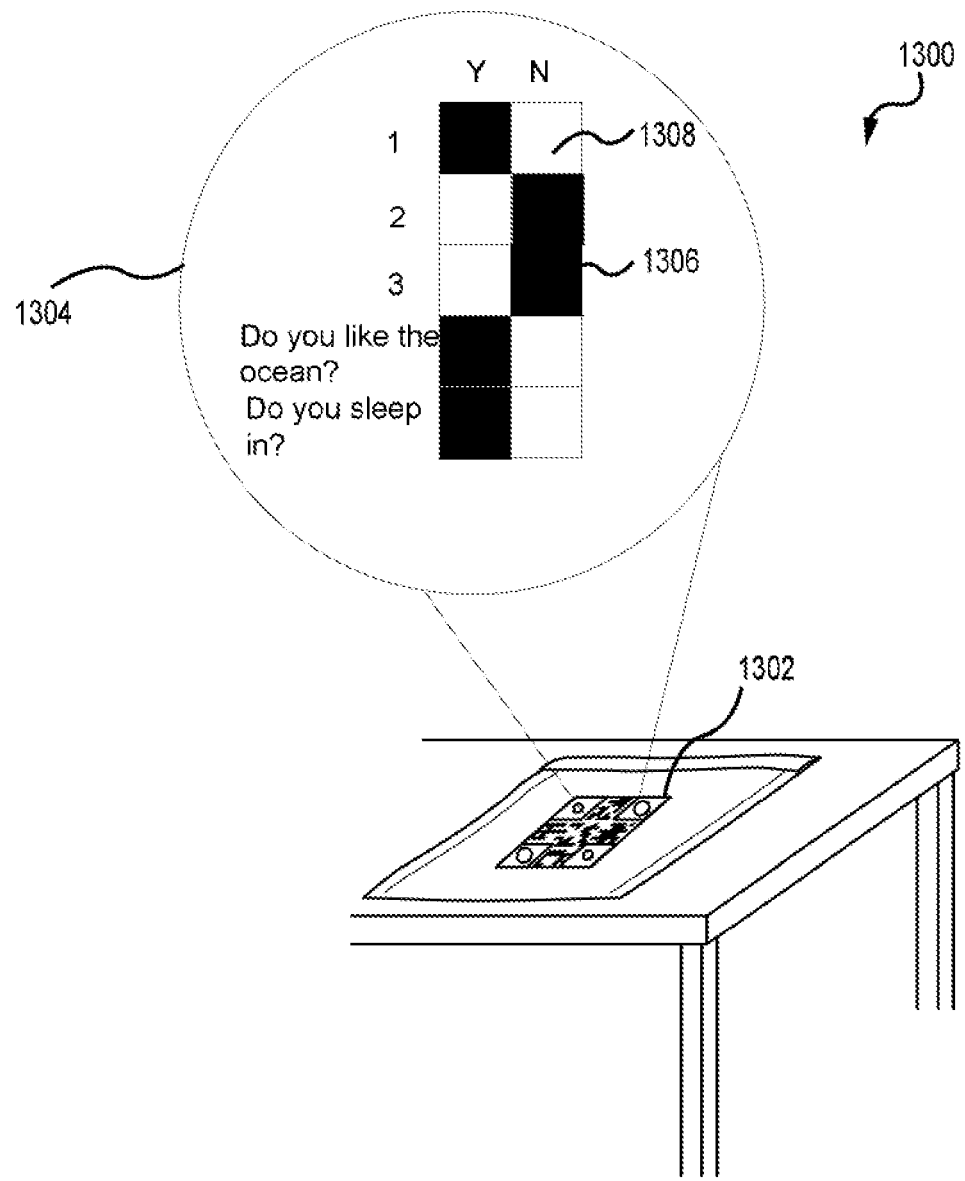
FIG. 13 illustrates an example situation of a tag that may be integrated into presentation of AR content in accordance with various embodiments.

FIG. 13 is an example situation 1300 where a user may select one or more options within a tag 1302 in order to receive personalized content, such as personalized AR content. For example in various embodiments, the user may physically modify one or more of the high contrast areas of the tag 1302 in order to receive different types of content. In various embodiments, the tag 1302 may include a user interaction area 1304 where the user can mark one or more areas to unlock different effects or AR content. For example, the illustrated interaction area 1304 includes a quiz where the user answers a series of "yes" or "no" questions in order to generate at least a portion of the tag 1302. Accordingly, different dark regions 1306 and light regions 1308 are generated. Different responses may lead to different AR content presented via the user device, as described above. In various embodiments, the quiz or other interactable content may be established by the provider, by a second user, or a combination thereof. For example, a second user may indicate that the first user, who receives the package, is a fan of a particular show or movie, and the provider may present options for the second user to select. Additionally, the second user may generate questions for a quiz and associated results.

In various embodiments, the interaction area 1304 may receive physical marks from the user, such as via a pen. As a result, the AR content may be considered a "single use" item in that, once the area is marked, it cannot be changed. Additionally, the AR application may record interactions for different user accounts. For example, a user account may be associated with a single ordered item, which may be provided in a single package. Once the user scans the package and receives the content, the user account may not be eligible to receive additional content until another order is received. However, in other embodiments, the user may interact with the tag multiple times.

As described above, in various embodiments, the interaction with the tag may lead to personalized AR content for the user. For example, rather than including the questions on the tag itself, the questions may be provided via the AR application and the user may then modify the tag based on their answers. In the illustrated embodiment, questions 1-3 correspond to questions that may be presented to the user on the device, while questions 4 and 5 are visibly written out on the tag. In this manner, the questions and associated content may be personalized for each user or rapidly adjusted for larger campaigns. For example, in an embodiment, a user may receive a quiz that will provide AR content based on a preferred television program for the user. Different users may receive different questions, and also different AR content, if they have different tastes in shows. The user may answer questions and then receive AR content directed toward the show, based on their answers, where different sets of answers may lead to different content. Accordingly, by enabling interaction with the tag, the user may be more engaged with the provider. Furthermore, interactions and modifications to the tag may enable specialized and personalized content for individual users and rapid development and implementation of new content because the tag and/or packaging may not be particularly directed to a specific campaign or event.

Figure 14:
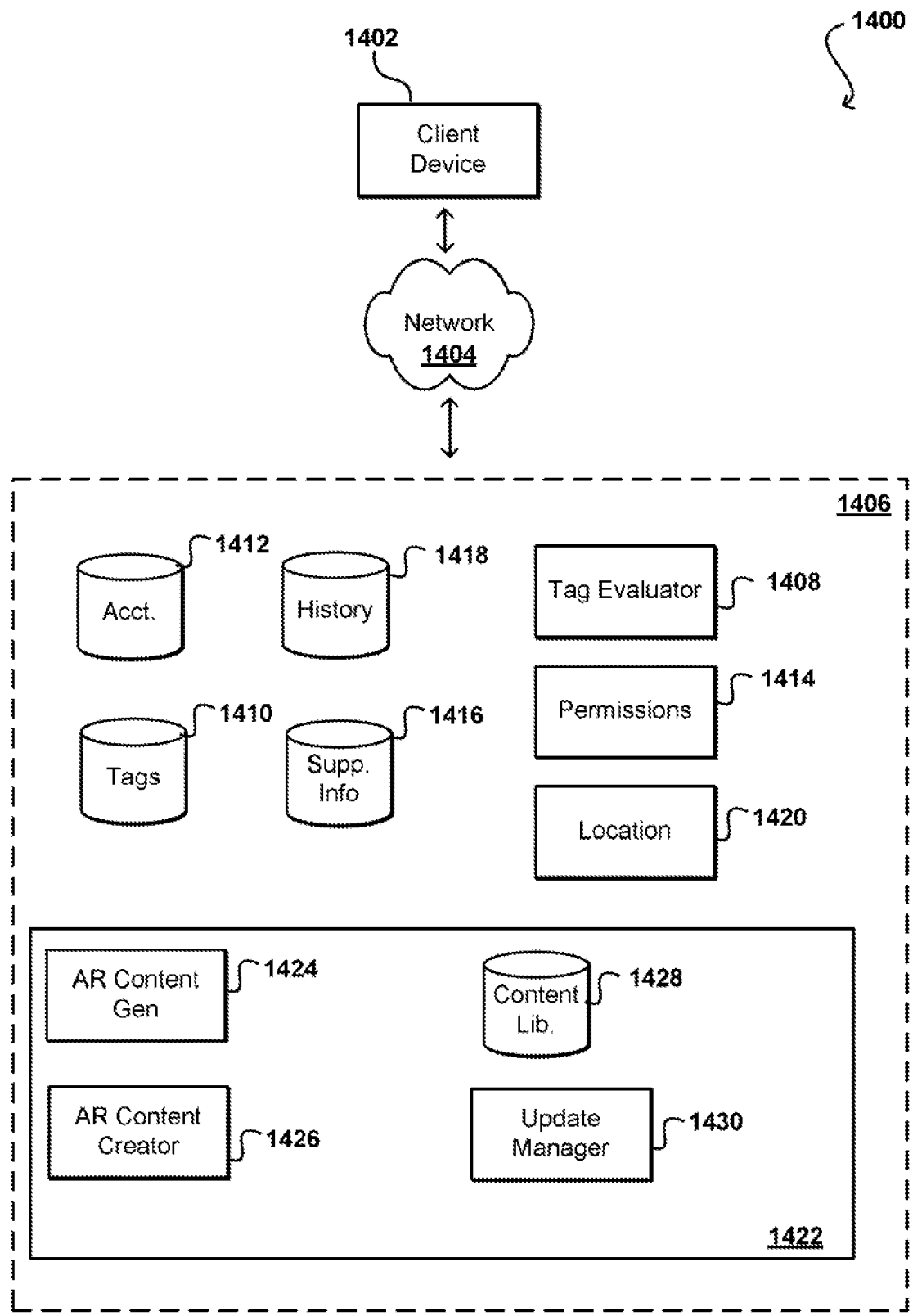
FIG. 14 illustrates an example AR application environment that can be used in accordance with various embodiments.

FIG. 14 illustrates an example environment 1400 in which aspects of the various embodiments can be implemented. In the example, a client device 1402 may transmit information, via a network 1404, to an AR application environment 1406. In various embodiments, the information includes at least a visual representation of an object, which may include a tag. The tag may be evaluated by the tag evaluator 1408 to determine further processing. For example, the tag may include a high contrast representation that identifies certain AR content associated with the object, among other things. The tag evaluator 1408 may determine if the tag is associated with a particular promotion or the like, which may lead to launching of AR content on the client device 1402.

In embodiments, the tag evaluator 1408 may be continuously updated, for example from a remote server or another module, to direct various tags to different types of AR applications and content. For example, in an embodiment where a tag is tied to a promotional event, such as an annual sale or a seasonal event, the tag may be directed toward content directed toward that sale for a period of time before the promotional event, but then updated after the promotional event for direction to a different set of content. Accordingly, the tag evaluator 1408 may be utilized to evaluate and direct further processing for selecting and presenting AR content. The tag evaluator 1408 may evaluate a variety of different tags and/or metadata associate with different objects, such as a primary tag to launch content, various sub-tags, and the like.

In various embodiments, the tag evaluator 1408 may be utilized, in part, with a tag data store 1410 in order to recognize and identify appropriate tags. For example, the tag data store 1410 may include preloaded image representations that correspond to tags, such as correlations between high contrast regions indicative of tags. Moreover, the tag data store 1410 may include logos or the like, which may be utilized as tags in various embodiments. The tags may correspond to different AR content, as described herein, and also may include additional information such as item dimensions, number of times a user may access the tags, and the like.

In various embodiments, utilization of the AR application and AR content may be tied to a user account. An account data store 1412 may be evaluated to determine whether the user of the client device 1402 has a registered account. If not, the user may be prompted to establish an account. The user account may be tied to a provider, such as a provider for an online marketplace, which enables the user to purchase items, which may be delivered in various types of packaging. As described above, various authentication methods may be utilized to identify the appropriate user for a given application. If there is a recognized user account, then a permission module 1414 may evaluate various authorizations provided with the account. The authorizations may be related to data collection, data sharing, and the like. These authorizations may be provided explicitly by the user. In other words, the user may agree to have information tracked and stored in order to provide an improved user experience, for example, by providing recommendations, saving shipping and payment information, and the like. The permissions may also be updated and changed by the user. Furthermore, in various embodiment, it should be appreciated that data may be anonymized such that identifying characteristics of users (e.g., names, etc.) are not associated with various components of information. For example, if a user were to upload a photograph of themselves to associate with their account, the account may be assigned an identification number and the photo and/or name of the user would not be utilized to identify information about the user.

In various embodiments, one or more supplemental data stores 1416 may store information related to the tags, such as ongoing promotions, available applications, or the like. Furthermore, as described above, the one or more supplemental data stores 1416 may also store information about various municipalities, such as recycling rules, and other information that may be useful for the user. Furthermore, user prefers and the like may be associated with the one or more supplemental data stores 1416.

The permission module 1414 regulates, at least in part, which promotions may be associated with certain users. For example, age restrictions may prevent promotions associated with mature material from being directed toward particular users. Similarly, a user that restricts certain data collection may not be provided with promotions or content linked to social media sharing, as the user may prevent such integration across the platform. In embodiments, the supplemental data stores 1416 may include promotional or event information that is tied to particular users based on a variety of aspects, such as geographic location, age, and the like. For example, during the month of July a user in the Northern Hemisphere would be directed toward content related to the summer while a user in the Southern Hemisphere would be directed toward content related to the winter. Moreover, users may have special access to certain content, for example through subscription services, that may be stored in one or more supplemental data stores 1416.

Information obtained from the data stores 1416 may be compared to a user history 1418, which may be used to select or generate AR content for the user. For example, the user history may be related to location history tracked by the location service 1420, such as a GPS locator or the like, previous purchases, search history, browsing history, or the like. As noted above, in various embodiments, the user may restrict or otherwise control the data that is acquired about the user, and as a result, the information within the history data store 1418 may be collected with consent from the user.

Upon selecting an appropriate promotion or other application, an AR module 1422 may generate AR content via an AR content generator 1424. As described above, the AR content may be related to a game, an avatar, a user experience with an object, or the like. In various embodiments, the AR content is personalized to the user based on information from the user account and/or the supplemental data stores 1416, among other locations. For example, in certain embodiments, the supplemental data stores 1416 may include information related to a purchaser of a gift for a user. The purchaser may elect to include a personalized message, which may be AR content, for the user. Accordingly, the AR content generator 1424 would generate this content in response to identification of an associated tag. The purchaser may utilize an AR content creator 1426 to generate the personalized message. For example, the purchaser may be granted access to a content library 1428 that may include various pre-loaded and prepared AR content that may be incorporated into the customized greeting. An update manager 1430 may update and incorporate new content over time, such as when new promotions are provided.

Figure 15:
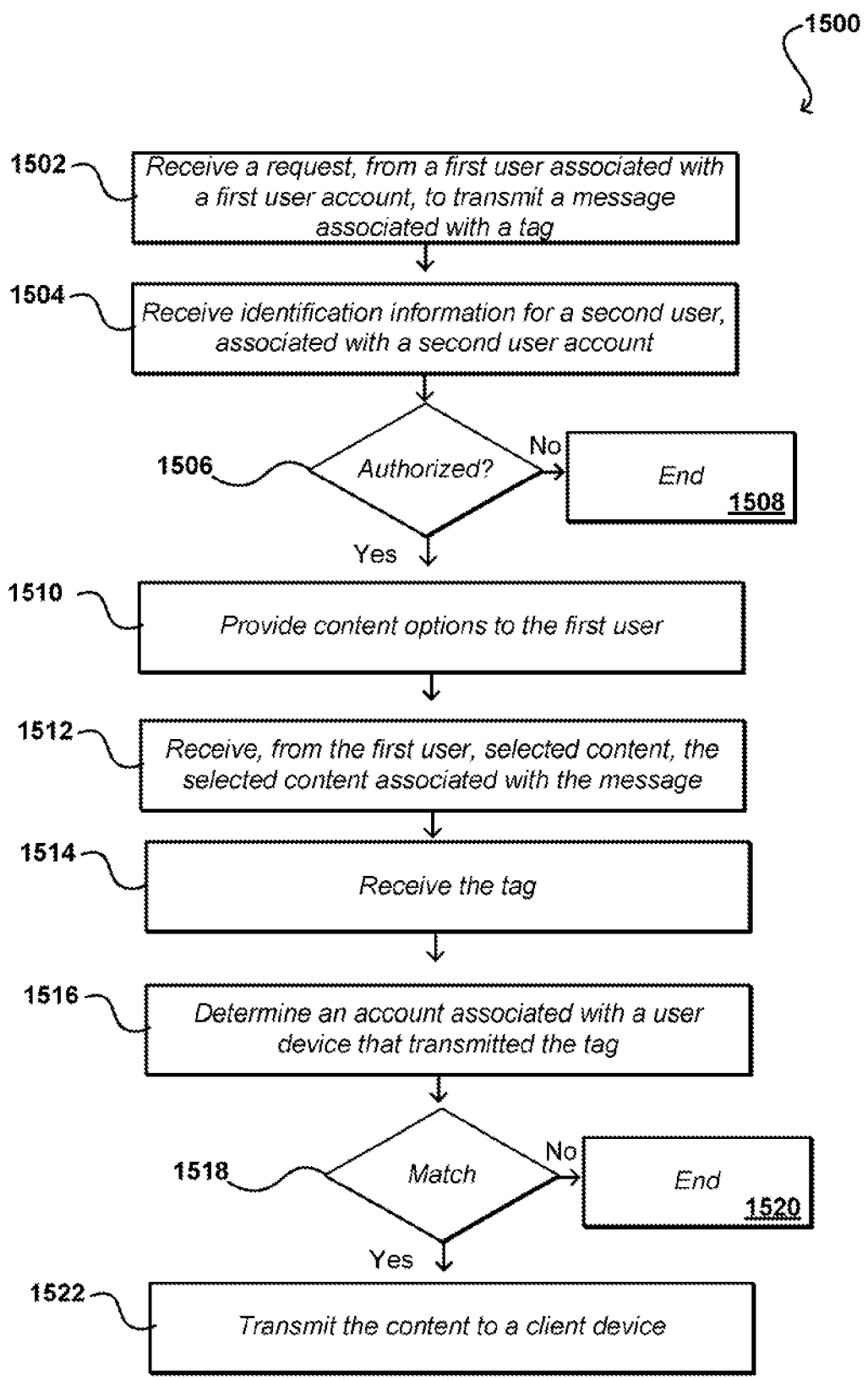
FIG. 15 illustrates an example process for providing AR content in accordance with various embodiments.

FIG. 15 illustrates an example method 1500 for providing a personalized message, which may include AR content, from a first user to second user. It should be understood that there can be additional, fewer, or alternative steps performed in similar or alternative orders, or in parallel, within the scope of the various embodiments unless otherwise stated. The example begins with receiving a request to transmit a message associated with a tag 1502. The request may be transmitted from a first user. In various embodiments, the first user has a first user account associated with a provider, for example, a provider of an online marketplace where users may purchase items (e.g., physical items, digital content, etc.) for themselves or for others. For example, if the first user desired to purchase an item for another, the user may elect to send the item to a second user. In various embodiments, the second user may have a list or registry of desired items. The second user's list may be at least partially anonymized, for example, by not allowing others to view the address, full name of the second user, or a variety of other information. In various embodiments, the first user may desire to send an item to the second user and include a personalized message, which may be triggered by a tag, as described here.

Identification information for the second user is received 1504. For example, the identification information may include a user name or the like associated with the second user. Additionally, a search query may be provided to view a list of users and the second user may be selected from the list. As noted above, the second user may elect to remove their information from a list or limit the users that may identify or otherwise locate their account. The identification information for the second user may be tied to a second user account, which is also available through the provider, such that the message may be linked to both the tag and the second user account. Authorization information may be evaluated 1506, to determine if the second user has provided consent to receive messages and/or items. For example, the user may limit who may provide the items and/or messages or may wholly exclude others from sending items and/or messages. If the second user has blocked such transmissions from the first user, the method ends 1508.

If the second user has authorized the transmissions, the first user is provided content options 1510. In various embodiments, the content items may include AR content, such as graphical or three-dimensional effects that may be presented to the second user upon activation via an AR application. In other embodiments, the content may be textual messages, sounds, videos, or content provided by the first user, such as photographs and the like. The content may be preloaded and generated by the provider for the convenience of the first user, may be provided by the first user, or a combination thereof. In certain embodiments, third party developers may also generate content that may be integrated into the service provided by the provider.

In various embodiments, the first user's content selections are received and associated with the message 1512, which is also associated with the tag, as noted above. For example, the first user may elect to send a video message along with a textual message, which may be directed to a special occasion (e.g., birthday, holiday, etc.) or the like. As a result, when the item is sent to the second user, either physically or digitally, at least a portion, such as the packaging, may include a tag to enable the second user to receive and utilize the message.

In embodiments, the second user receives the item and transmits the tag to the provider. For example, the second user may utilize an AR application that may identify the tag, such as via a camera on a user device, and the provider may receive the tag 1514. In various embodiments, the AR application may be associated with the second user's account. However, in other applications, the tag may be transmitted outside of the AR application or authorization may be requested prior to launching AR content. Accordingly, the provider may determine an account associated with the user device transmitting the tag 1516. As noted above, if the second user has logged into the AR application, the authorization may be provided to proceed. Thereafter, the tag may be evaluated to determine a match with messages or the like 1518. If there are no corresponding messages, the method ends 1520. For example, the user may receive a message indicating that there is no associated additional content. However, if the tag corresponds to a message, the provider may transmit the content, which may be AR content, to the client device 1522. For example, user accounts may include a message data store where incoming messages are stored and retrieved upon receipt of the appropriate tag. Additionally, in various embodiments, the tags may be linked or otherwise tied to the messages and the users. For example, in an embodiment, a tag may be received and evaluated to determine whether the transmitting user is associated with the tag, and thereafter, what information also corresponds to the particular tag and the transmitting user. In this manner, additional information may be provided along with the initial item. Moreover, the additional content may not be limited by the physical constraints of the item. For example, it may be difficult to gift wrap a small item, but the AR content may provide digitized flowers and music to provide an improved experience to the user. Additionally, providing the personalized and user account associated messaging may encourage users to utilize the provider's services.

Figure 16:
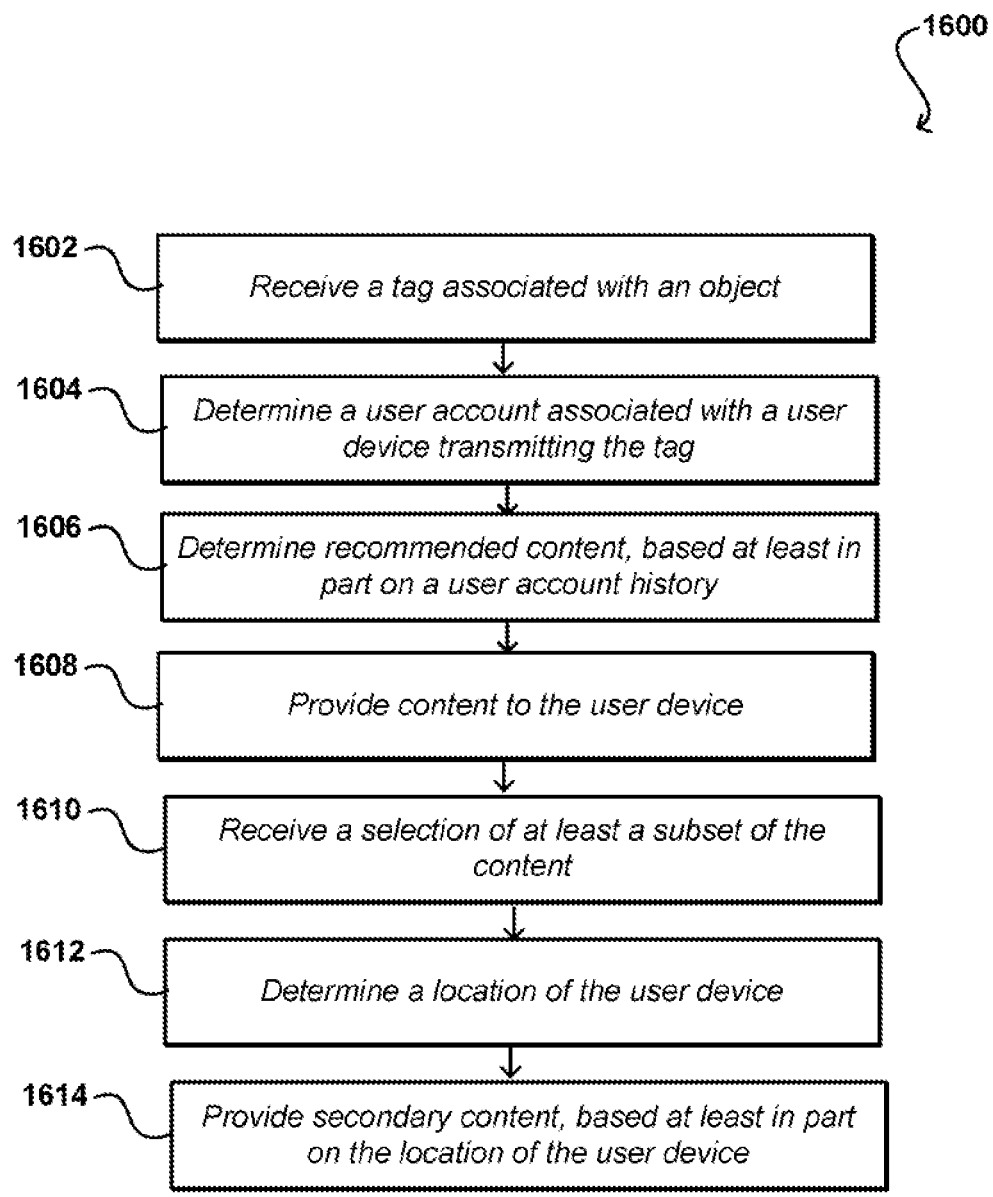
FIG. 16 illustrates an example process for determining AR content in accordance with various embodiments.

FIG. 16 illustrates an example method 1600 for presenting content, such as AR content, based at least in part on user information, such as user history, user location, and the like. The example begins by receiving a tag associated with an object 1602. For example, in various embodiments, the object may be a package that includes an item, such as an item that was purchased through an online marketplace. The tag may be a high contrast object, as described above, presented on the object. For example, the tag may include a logo for the provider or a specialized logo directed to a promotional event, among other options. Upon receipt of the tag, a user account may be determined 1604. The user account may be associated with an AR application that used to transmit the tag. In various embodiments, the user account may be associated with a provider, such as the provider of the online marketplace, and may include additional information about the user, which may be associated with the AR application with consent from the user.

In embodiments, recommend content is determined based at least in part on a user account history 1606. For example, the user account history may include information such as past purchases, browsing history, linked social media accounts, provided interest, and the like. Accordingly, the content may be determined based at least in part on an interest of the user. For example, if the user has purchased several books on environmental care and recycling, the content may be directed toward recycling. However, it should be appreciated that, in other embodiments, the content may be predetermined based on the tag and the user information may not be utilized to provide the tag. For example, the tag may be directed to a promotional event and the content may be associated with that promotional event.

The content is provided to the user device 1608 and the user may interact with the content to transmit a selection 1610. For example, the content may include selectable icons that may provide additional information to the user. The content may include general information or may lead to secondary content to provide even more educational or promotional information. By way of example only, the content may be associated with recycling and the user may select a subset of the content to locate nearby recycling centers. As a result, a location of the user device is determined 1612. For example, the user may provide authorization to utilize a GPS device incorporated into the user device to determine a location of the user. As a result, a search may be executed to locate nearby recycling centers, by way of example. The secondary content is then provided to the user 1614. For example, a listing of recycling centers may be presented to the user such that the user can choose to perform a secondary action, such as visiting the center to recycle the object. In this manner, additional information about the user may be used to determine at least a portion of the presented content. As noted above, in various embodiments, at least a portion of the content may be AR content to provide an integrated and entertaining experience for the user, which may encourage the user to utilize the application in more instances.

Figure 17:
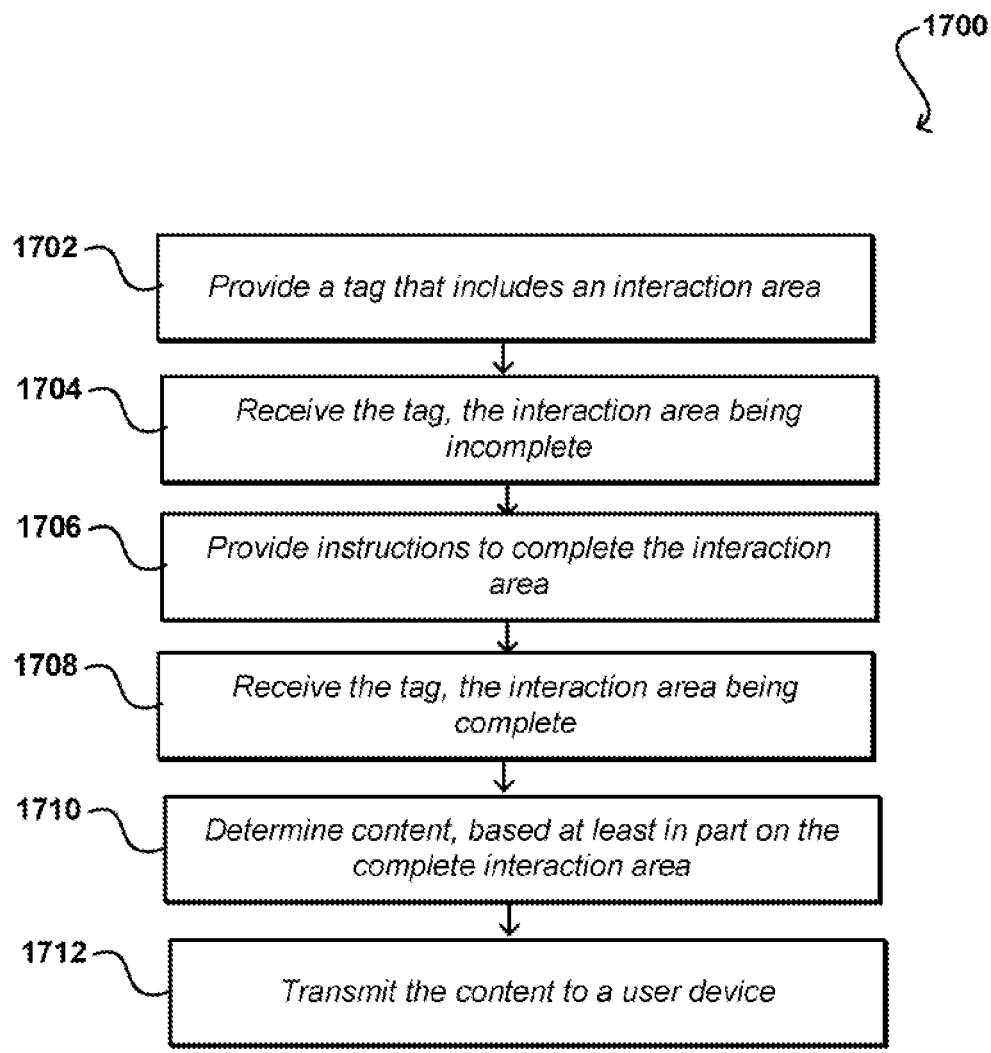
FIG. 17 illustrates an example process for providing AR content in accordance with various embodiments.

FIG. 17 illustrates an example method 1700 for presenting content, such as AR content, based at least in part on user interactions. The example begins with providing a tag, which may be associated with an object, that includes an interaction area 1702. The interaction area may be associated with a high contrast area of the tag where the user may provide a physical marking to the tag to adjust how the tag is interpreted. For example, the interaction area may be associated with a quiz or questionnaire that the user may fill out, which may adjust an appearance of the tag, which may adjust content related to the tag. The user may interact with the tag, such as by scanning the tag using a user device and an AR application executing on the user device, and the provider may receive the tag 1704. In embodiments, the provider may receive the tag with an incomplete interaction area. The provider may provide instructions, to the user, to complete the interaction area 1706. In various embodiments, the user may physically complete the interaction area, such as by filling in blanks or the like. In certain embodiments, the user may digitally complete the interaction area. The provider may receive the completed interaction area 1708. Upon receipt, the provider determines content, based at least in part on the interaction area 1710. For example, the interaction area may be related to a questionnaire that provides different content in response to the provided answers. As a result, the complete of the interaction area may, at least in part, determine subsequent content presentation. The provider may transmit the content to the user device 1712. Accordingly, the user may select the received content and receive personalized content based on the interaction area.

Figure 18:
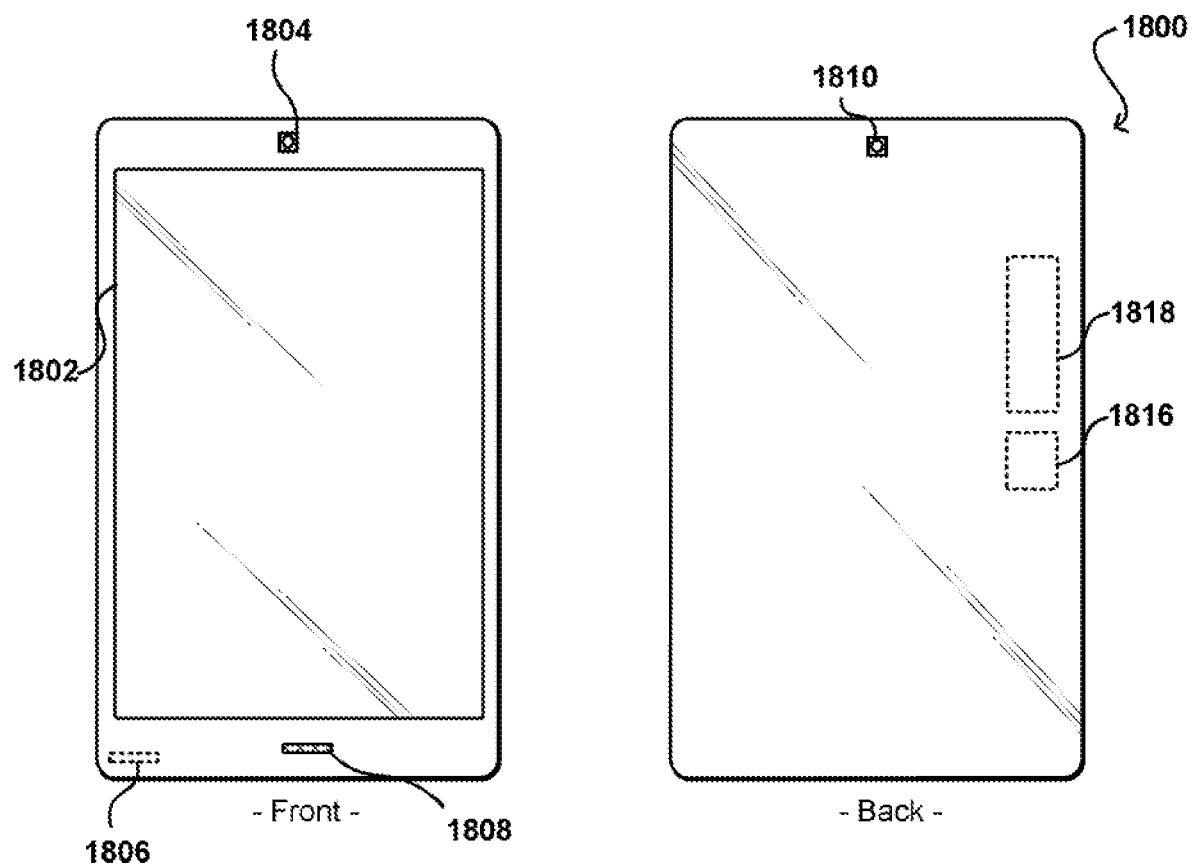
FIG. 18 illustrates an example computing device that can execute a gaming application in accordance with various embodiments.

FIG. 18 illustrates front and back views of an example electronic computing device 1800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 1800 has a display screen 1802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 1804 on the front of the device and at least one image capture element 1810 on the back of the device. It should be understood, however, that image capture elements could also, or alternatively, be placed on the sides or corners of the device, and that there can be any appropriate number of capture elements of similar or different types. Each image capture element 1804 and 1810 may be, for example, a camera, a charge-coupled device (CCD), a motion detection sensor or an infrared sensor, or other image capturing technology.

As discussed, the device can use the images (e.g., still or video) captured from the imaging elements 1804 and 1810 to generate a three-dimensional simulation of the surrounding environment (e.g., a virtual reality of the surrounding environment for display on the display screen of the device). Further, the device can utilize outputs from at least one of the image capture elements 1804 and 1810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 1808 on the front side of the device. In some devices there may be only one microphone, while in other devices there might be at least one microphone on each side and/or corner of the device, or in other appropriate locations.

The device 1800 in this example also includes one or more orientation- or position-determining elements 1818 operable to provide information such as a position, direction, motion, or orientation of the device. These elements can include, for example, accelerometers, inertial sensors, electronic gyroscopes, and electronic compasses.

The example device also includes at least one communication mechanism 1806, such as may include at least one wired or wireless component operable to communicate with one or more electronic devices. The device also includes a power system 1816, such as may include a battery operable to be recharged through conventional plug-in approaches, or through other approaches such as capacitive charging through proximity with a power mat or other such device. Various other elements and/or combinations are possible as well within the scope of various embodiments.

Figure 19:
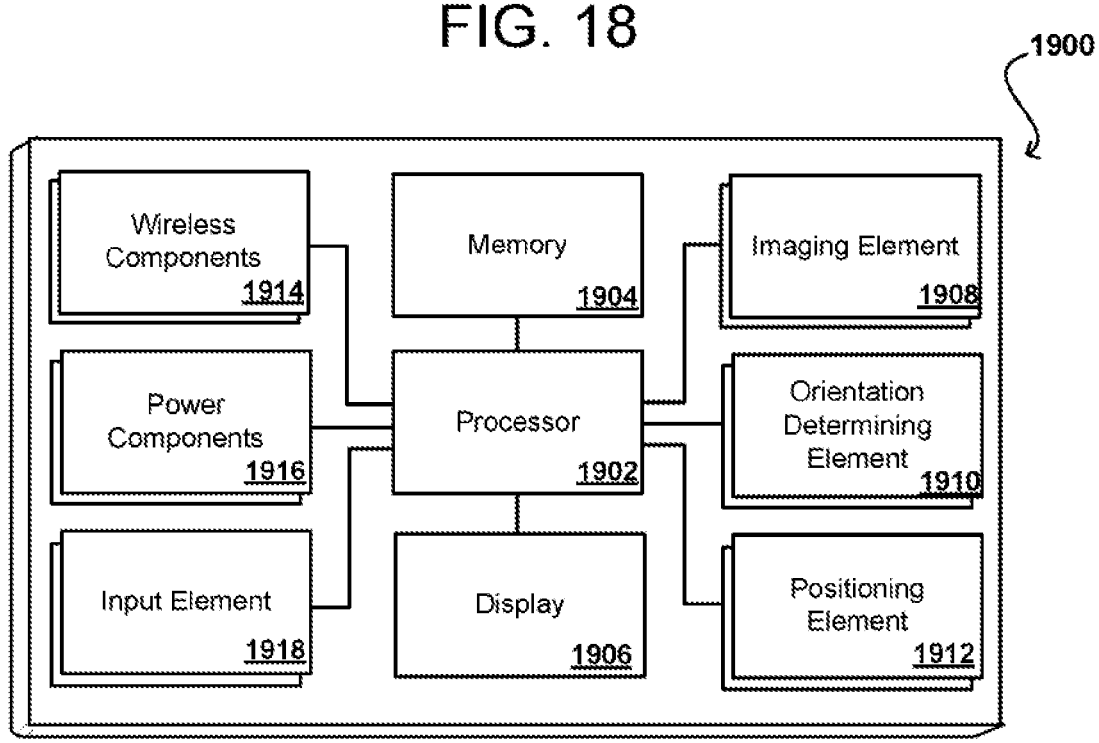
FIG. 19 illustrates example components of a computing device that can be used to implement aspects of the various embodiments.

FIG. 19 illustrates a set of basic components of an electronic computing device 1900 such as the device 1800 described with respect to FIG. 18. In this example, the device includes at least one processing unit 1902 for executing instructions that can be stored in a memory device or element 1904. As would be apparent to one of ordinary skill in the art, the device can include many types of memory, data storage, or computer-readable media, such as a first data storage for program instructions for execution by the processing unit(s) 1902, the same or separate storage can be used for images or data, a removable memory can be available for sharing information with other devices, and any number of communication approaches can be available for sharing with other devices.

The device typically will include some type of display screen 1906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1900 also includes at least one orientation determining element 1910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing content, comprising:
receiving a request, from a first user, to transmit a social media message associated with a tag, the tag being associated with a packaging of an object for delivery;
receiving identification information for a second user;
determining a second user account associated with the second user;
providing content options to the first user including one or more tracking elements associated with a performance measure of the social media message;
receiving, from the first user, selected content from the content options, the selected content being integrated into the social media message;
generating the social media message, based at least in part on the selected content;
providing, upon delivery of the object, an alert, to the second user, the alert including a delivery confirmation and an indication to interact with the tag, the alert provided prior to a second user interaction with the second user account;
receiving, from a device authorized to access the second user account, verification that the device has interacted with the tag;
determining, based at least in part on second user account information, the tag is associated with the social media message; and
providing the social media message to the second user.

2. The method of claim 1, further comprising:
determining a permission of the second user account authorizes the receipt of messages.

3. The method of claim 1, wherein the social media message includes a graphical element, a textual element, a video element, an auditory element, augmented reality (AR) content, or a combination thereof.

4. The method of claim 1, wherein the first user is associated with the second user account.

5. A method for providing content, comprising:
receiving a representation of a tag, from a user device, the tag corresponding to a content trigger associated with a provider;
determining a user account, the user account associated with the user device;
determining social media content for presentation on the user device, the social media content being authorized for presentation to the user account and selected by the provider from a list of social media content, the social media content including one or more tracking elements associated with a performance measure of the social media content, a content authorization status and the selection based at least in part on user information associated with the user account; and
providing the social media content, to the user device, for display within an augmented reality (AR) application.

6. The method of claim 5, further comprising:
determining the representation of the tag includes an incomplete physical region;
providing a message, to the user device, to complete the incomplete physical region;
receiving a second representation of the tag, the second representation of the tag including a physical marking that completes the incomplete physical to form a complete region; and
determining the social media content, based at least in part on the complete region.

7. The method of claim 5, further comprising:
receiving an input from the user device, the input associated with a selectable portion of the social media content;
determining secondary content, based at least in part on the input and the user information; and
providing the secondary content, to the user device, for display within the AR application.

8. The method of claim 7, further comprising:
determining location information for the user device; and
determining the secondary content, based at least in part on the location information.

9. The method of claim 5, further comprising:
receiving a request, from a second user, to transmit a message to a first user associated with the user device;
determining a permission status, for the first user, the permission status permitting receipt of the message; and
selecting the social media content, based at least in part on selected content elements chosen by the second user.

10. The method of claim 9, wherein the message includes a graphical element, a textual element, a video element, an auditory element, AR content, or a combination thereof.

11. The method of claim 9, further comprising:
providing, to the second user, a content library, the content library including a plurality of content elements for inclusion with the message;
receiving, from the second user, the selected content elements; and
generating the message.

12. The method of claim 5, further comprising:
receiving an input, from the user device, associated with a sharing application; and
providing the social media content to a selected social media platform.

13. The method of claim 5, further comprising:
determining a list of content associated with the tag; and
determining, from the list of content, a subset of content for presentation on the user device, based at least in part on a provider criteria, the provider criteria including at least one of a campaign, a promotion, or a special event.

14. The method of claim 5, wherein at least a portion of the social media content includes augmented reality (AR) content, the AR content providing a visual representation of information provided to the user device, the information corresponding to at least one of an environmental impact or a social impact.

15. The method of claim 5, further comprising:
sending a message, to the user device, to scan the tag using a camera incorporated into the user device.

16. A system, comprising:
at least one processor; and
memory including instructions that, when executed by the at least one processor, cause the system to:
receive a representation of a tag, from a user device, the tag corresponding to a content trigger associated with a provider;
determine a user account, the user account associated with the user device;
determine social media content for presentation on the user device, the social media content being authorized for presentation to the user account and selected by the provider from a list of social media content, the social media content including one or more tracking elements associated with a performance measure of the social media content, a content authorization status and the selection based at least in part on user information associated with the user account; and provide the social media content, to the user device, for display within an augmented reality (AR) application.

17. The system of claim 16, wherein the instructions when executed further cause the system to:

determine the representation of the tag includes an incomplete physical region;

provide a message, to the user device, to complete the incomplete physical region;

receive a second representation of the tag, the second representation of the tag including a physical marking that completes the incomplete physical to form a complete region; and determine the social media content, based at least in part on the complete region.

18. The system of claim 16, wherein at least a portion of the social media content includes augmented reality (AR) content, the AR content providing a visual representation of information provided to the user device, the information corresponding to at least one of an environmental impact or a social impact.

19. The system of claim 16, wherein the instructions when executed further cause the system to:

receive a request, from a second user, to transmit a message to a first user associated with the user device;

determine a permission status for the first user enables receipt of the message; and select the social media content, based at least in part on selected content elements chosen by the second user.

20. The system of claim 16, wherein the instructions when executed further cause the system to:

determine a list of content associated with the tag; and determine, from the list of content, a subset of content for presentation on the user device, based at least in part on a provider criteria, the provider criteria including at least one of a campaign, a promotion, or a special event.

\* \* \* \* \*